(12) United States Patent
Blanche et al.

(10) Patent No.: US 9,406,253 B2
(45) Date of Patent: Aug. 2, 2016

(54) VISION CORRECTIVE DISPLAY

(71) Applicant: Broadcom Corporation, Irvine, CA (US)

(72) Inventors: Bradley Blanche, Aliso Viejo, CA (US); Raymond Szeto, Quincy, MA (US)

(73) Assignee: BROADCOM CORPORATION, Irvine, CA (US)

( * ) Notice: Subject to any disclaimer, the term of this patent is extended or adjusted under 35 U.S.C. 154(b) by 186 days.

(21) Appl. No.: 13/931,836

(22) Filed: Jun. 29, 2013

(65) Prior Publication Data

US 2014/0267284 A1    Sep. 18, 2014

Related U.S. Application Data

(60) Provisional application No. 61/784,656, filed on Mar. 14, 2013.

(51) Int. Cl.
| | |
|---|---|
| *G06T 17/00* | (2006.01) |
| *G09G 3/20* | (2006.01) |
| *G09G 3/00* | (2006.01) |
| *H04N 13/04* | (2006.01) |

(52) U.S. Cl.
CPC ............... *G09G 3/20* (2013.01); *G09G 3/003* (2013.01); *H04N 13/0402* (2013.01)

(58) Field of Classification Search
CPC ..... H04N 13/0402; H04N 13/00; G09G 3/20; G09G 3/003; G09G 5/391; G06T 5/00; G06T 15/04; G06T 17/20; G06T 15/00; G06T 2210/36
See application file for complete search history.

(56) References Cited

U.S. PATENT DOCUMENTS

| | | | | |
|---|---|---|---|---|
| 5,144,344 A * | 9/1992 | Takahashi et al. | ............... | 351/44 |
| 5,349,451 A * | 9/1994 | Dethardt | ............... | H04N 1/3935 358/451 |
| 5,436,681 A * | 7/1995 | Michaels | ............... | 351/240 |
| 6,072,443 A * | 6/2000 | Nasserbakht | ............... | G09G 3/002 345/156 |
| 6,094,216 A * | 7/2000 | Taniguchi | ............... | G09G 3/003 348/51 |
| 6,208,754 B1* | 3/2001 | Abe | ............... | G06T 9/007 382/166 |
| 6,262,694 B1* | 7/2001 | Ishimoto | ............... | H04N 13/0239 345/1.1 |
| 6,330,075 B1* | 12/2001 | Ishikawa | ............... | H04N 1/52 358/1.9 |
| 6,489,988 B1* | 12/2002 | Hamada | ............... | H04N 17/06 348/180 |
| 7,262,879 B2* | 8/2007 | Chang | ............... | H04N 1/40075 358/1.9 |
| 7,840,444 B2* | 11/2010 | Mellon et al. | ............... | 705/26.5 |
| 8,358,335 B2* | 1/2013 | de la Barre | ............... | G09G 3/003 345/419 |

(Continued)

*Primary Examiner* — Phi Hoang
*Assistant Examiner* — Charles L Beard
(74) *Attorney, Agent, or Firm* — Foley & Lardner LLP

(57) ABSTRACT

Disclosed are various embodiments that relate to a display that renders corrected images to viewers so that users do not need to wear corrective lenses. The system obtains a vision parameter associated with a viewer and/or content to be displayed. The system receives an image for display to the viewer and modifies the image according to the vision parameter to generate a modified vision corrected image. The system renders the modified region on a rear display while rendering a selective barrier on a front barrier display to direct a vision corrected image to a viewer according to the vision parameter.

37 Claims, 13 Drawing Sheets

(56) References Cited

U.S. PATENT DOCUMENTS

| | | | |
|---|---|---|---|
| 8,570,366 B2* | 10/2013 | Haga | 348/56 |
| 8,773,331 B2* | 7/2014 | Zustak et al. | 345/51 |
| 8,807,746 B2* | 8/2014 | Kato et al. | 351/159.41 |
| 8,945,197 B1* | 2/2015 | Friend | A61N 5/0622 607/88 |
| 8,956,396 B1* | 2/2015 | Friend | A61N 5/06 607/88 |
| 9,159,299 B2* | 10/2015 | Lee | G09G 3/003 |
| 9,286,817 B2* | 3/2016 | Takenaka | G09G 3/003 |
| 2001/0048505 A1* | 12/2001 | Silliphant | 351/159 |
| 2002/0005848 A1* | 1/2002 | Asai et al. | 345/419 |
| 2003/0043262 A1* | 3/2003 | Takemoto et al. | 348/46 |
| 2004/0120035 A1* | 6/2004 | Hoffmann | G02C 7/101 359/407 |
| 2006/0028400 A1* | 2/2006 | Lapstun | G02B 26/06 345/8 |
| 2006/0087556 A1* | 4/2006 | Era | 348/51 |
| 2006/0290712 A1* | 12/2006 | Hong | G06F 9/4443 345/619 |
| 2008/0094572 A1* | 4/2008 | Lai | 351/177 |
| 2008/0239239 A1* | 10/2008 | Honda | A61B 3/0041 351/208 |
| 2008/0273170 A1* | 11/2008 | Watanabe | 351/177 |
| 2009/0073375 A1* | 3/2009 | Nakada | 351/45 |
| 2009/0096726 A1* | 4/2009 | Uehara et al. | 345/84 |
| 2009/0322861 A1* | 12/2009 | Jacobs et al. | 348/53 |
| 2010/0060857 A1* | 3/2010 | Richards et al. | 353/7 |
| 2010/0149073 A1* | 6/2010 | Chaum | G02B 27/0093 345/8 |
| 2010/0201897 A1* | 8/2010 | Saitoh et al. | 349/13 |
| 2010/0259603 A1* | 10/2010 | Mihara | H04N 13/0438 348/53 |
| 2010/0271590 A1* | 10/2010 | Kitani | G02C 7/025 351/159.42 |
| 2010/0315316 A1* | 12/2010 | Mihara | H04N 13/0497 345/32 |
| 2011/0074778 A1* | 3/2011 | Turner | H04N 13/026 345/420 |
| 2011/0128555 A1* | 6/2011 | Rotschild et al. | 356/625 |
| 2011/0164122 A1* | 7/2011 | Hardacker | 348/53 |
| 2011/0181828 A1* | 7/2011 | Yi et al. | 351/47 |
| 2011/0187832 A1* | 8/2011 | Yoshida | 348/46 |
| 2011/0216061 A1* | 9/2011 | De La Barre | G06T 15/00 345/419 |
| 2011/0221999 A1* | 9/2011 | Shiau et al. | 349/62 |
| 2011/0261451 A1* | 10/2011 | Kwrk | 359/465 |
| 2011/0285830 A1* | 11/2011 | Kim et al. | 348/56 |
| 2011/0292185 A1* | 12/2011 | Takenaka | G09G 3/003 348/51 |
| 2011/0299034 A1* | 12/2011 | Walsh | A61B 3/102 351/206 |
| 2011/0310099 A1* | 12/2011 | Yamana | G09G 3/003 345/419 |
| 2012/0002011 A1* | 1/2012 | Inoue et al. | 348/43 |
| 2012/0007963 A1* | 1/2012 | Matsumura | G03B 35/16 348/51 |
| 2012/0019778 A1* | 1/2012 | Hamaguchi | A61B 3/0008 351/206 |
| 2012/0038632 A1* | 2/2012 | Matsunaga | G02B 27/2214 345/419 |
| 2012/0069294 A1* | 3/2012 | Ohno et al. | 351/153 |
| 2012/0069296 A1* | 3/2012 | Li et al. | 351/201 |
| 2012/0075292 A1* | 3/2012 | Yamaji et al. | 345/419 |
| 2012/0120207 A1* | 5/2012 | Shimazaki et al. | 348/51 |
| 2012/0154371 A1* | 6/2012 | Mihara et al. | 345/214 |
| 2012/0162219 A1* | 6/2012 | Kobayashi et al. | 345/419 |
| 2012/0194781 A1* | 8/2012 | Agurok | 351/201 |
| 2012/0218325 A1* | 8/2012 | Hiroki | G09G 3/003 345/697 |
| 2012/0235992 A1* | 9/2012 | Tsuda et al. | 345/419 |
| 2012/0314024 A1* | 12/2012 | Tsang | G09G 3/003 348/43 |
| 2013/0072828 A1* | 3/2013 | Sweis et al. | 601/37 |
| 2013/0077052 A1* | 3/2013 | Horiguchi et al. | 353/7 |
| 2013/0093788 A1* | 4/2013 | Liu | G06F 3/011 345/633 |
| 2013/0093796 A1* | 4/2013 | Lee | G09G 3/003 345/690 |
| 2013/0106694 A1* | 5/2013 | Tanaka et al. | 345/157 |
| 2013/0128164 A1* | 5/2013 | Kim | 349/15 |
| 2013/0148070 A1* | 6/2013 | Kim et al. | 349/143 |
| 2013/0163078 A1* | 6/2013 | Saito | H04N 13/0402 359/466 |
| 2013/0169623 A1* | 7/2013 | Han | 345/419 |
| 2013/0187852 A1* | 7/2013 | Ebina et al. | 345/158 |
| 2013/0188127 A1* | 7/2013 | Cabeza Guillen et al. | 351/202 |
| 2013/0201090 A1* | 8/2013 | Ohara | G09G 3/3677 345/87 |
| 2013/0242062 A1* | 9/2013 | Ming | G06F 3/0481 348/51 |
| 2013/0253891 A1* | 9/2013 | Inoue | A61B 3/028 703/6 |
| 2013/0285885 A1* | 10/2013 | Nowatzyk et al. | 345/8 |
| 2013/0286303 A1* | 10/2013 | Shibuya et al. | 349/13 |
| 2013/0342571 A1* | 12/2013 | Kinnebrew | G06F 3/147 345/633 |
| 2014/0043314 A1* | 2/2014 | Park | G06F 3/038 345/212 |
| 2014/0078194 A1* | 3/2014 | An | G09G 3/003 345/691 |
| 2014/0118829 A1* | 5/2014 | Ma et al. | 359/567 |
| 2014/0168034 A1* | 6/2014 | Luebke | G02B 27/017 345/8 |
| 2014/0168035 A1* | 6/2014 | Luebke | G02B 27/017 345/8 |
| 2014/0168783 A1* | 6/2014 | Luebke | G02B 27/017 359/630 |
| 2015/0222885 A1* | 8/2015 | de la Barr | G02B 26/00 348/59 |
| 2015/0256818 A1* | 9/2015 | de la Barr | H04N 13/0409 348/51 |

* cited by examiner

US 9,406,253 B2

VISION CORRECTIVE DISPLAY

CROSS REFERENCE TO RELATED PATENTS/PATENT APPLICATIONS

The present application claims the benefit of and priority to co-pending U.S. Provisional patent application titled, "Lensless Vision Corrective Display", having Ser. No. 61/784,656, filed Mar. 14, 2013, which is hereby incorporated by reference herein in its entirety for all purposes.

TECHNICAL FIELD

The present disclosure relates generally to displaying an image on a display device and, more particularly but not exclusively, to a visually corrective display that modifies the display to account for vision impairments.

BACKGROUND

A person who does not have 20/20 vision often sees parts of the world out of focus. Some eye conditions associated with poor vision include myopia (near-sightedness), hyperopia (far-sightedness), astigmatism, diplopia and presbyopia. A non-surgical solution is to wear corrective lenses such as eye glasses or contact lenses. However, if the person does not wear corrective lenses, the problem of out of focus images remains.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

DETAILED DESCRIPTION

The present disclosure relates to displaying an image on a display device such that the displayed image may be selected so as to possess certain visual characteristics. In one or more embodiments, display is referred to as a vision corrective display or a visually self-corrective display, such that the image displayed on the display may be modified to account for vision impairments. For example, the vision corrective display is able to modify the display of an image to account for different viewer focal points, thereby allowing the focus of the displayed image to be adjusted through operation of the display and allowing a viewer to perceive an image in focus without requiring wearable lenses (i.e., glasses or contact lenses). Through simple operation of the vision corrective display, blurriness of an image to a vision impaired viewer can be reduced or eliminated. According to various embodiments, vision correction may use a selective direction display.

Figure 1A:
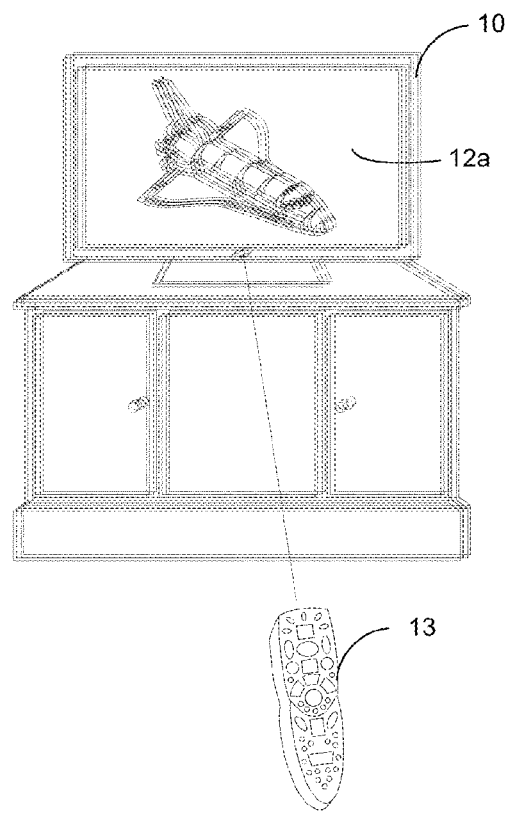
FIG. 1A is an example of a vision impaired viewer viewing a display without vision correction, according to various embodiments of the present disclosure.

According to various embodiments, a vision corrective display is provided through which an image is presented in a manner where the image may be adjusted so as to modify its appearance to a viewer. In one or more embodiments and as illustrated in connection with FIGS. 1A and 1B, operation of the vision corrective display 10 can be controlled such that the image being displayed appears to be more in focus to a vision impaired viewer. For example, the presented image on the display 10 can be adjusted to account for visual impairment of the viewer (e.g., to account for the eye prescription of the viewer). As shown in FIG. 1A, an image 12a being displayed on the vision corrective display 10 may be out of focus (or otherwise possess an undesirable appearance) to a viewer based on the visual impairment of the viewer. The viewer of FIG. 1A is vision impaired such that objects that are close to the viewer appear in focus while objects far away from the viewer appear out of focus. Thus, an input device 13 such as a remote control that is near the viewer may be in focus for the viewer, while the display 10, the image 12a rendered on the display, and objects near the display (e.g., a display stand) appear out of focus.

Figure 1B:
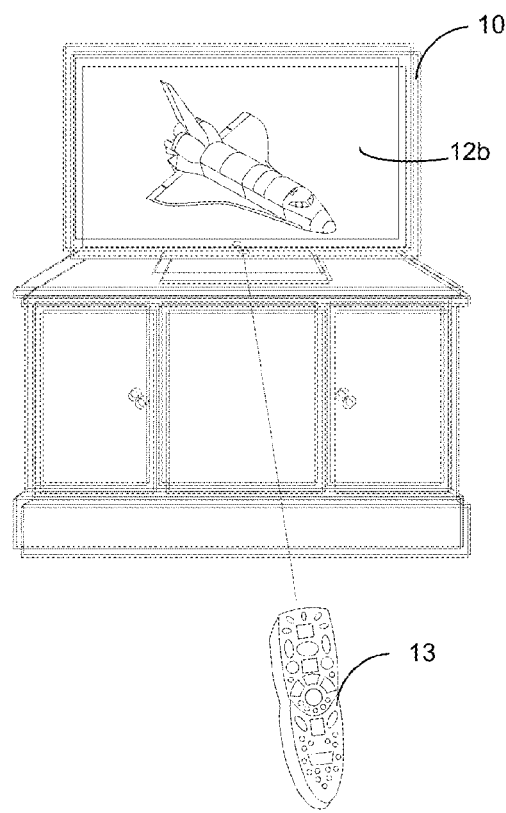
FIG. 1B is an example of the vision impaired viewer of FIG. 1A viewing the display with vision correction, according to various embodiments of the present disclosure.

Operation of the vision corrective display 10 can be controlled to adjust the displayed image 12b until it appears more in focus (or otherwise appears more desirable) for the viewer, as illustrated in FIG. 1B. According to the viewer's eyesight or visual preferences, the displayed image 12b may be adjusted or modified in a controlled manner to achieve a desired result (e.g., an in-focus image for the viewer). As shown in FIG. 1B, the display 10 may render an image 12b that appears to be more in focus for the viewer of FIG. 1A having impaired vision. However, objects near the image 12b (e.g., a display stand) continue to be out of focus. According to various embodiments, the viewer may utilize an input device 13 to submit his or her visual preferences to the display 10 to render images 12b that are in focus.

Although FIGS. 1A and 1B depict a non-limiting example of a display 10 configured to visually correct an image 12b for an eyesight impaired viewer, various embodiments are no so limited. For example, the display 10 may render an image 12b in a manner that accounts for a viewer who is impaired with hyperopia (farsightedness), astigmatism, myopia (near-sightedness), diplopia, presbyopia or any other vision impairment.

Figure 2:
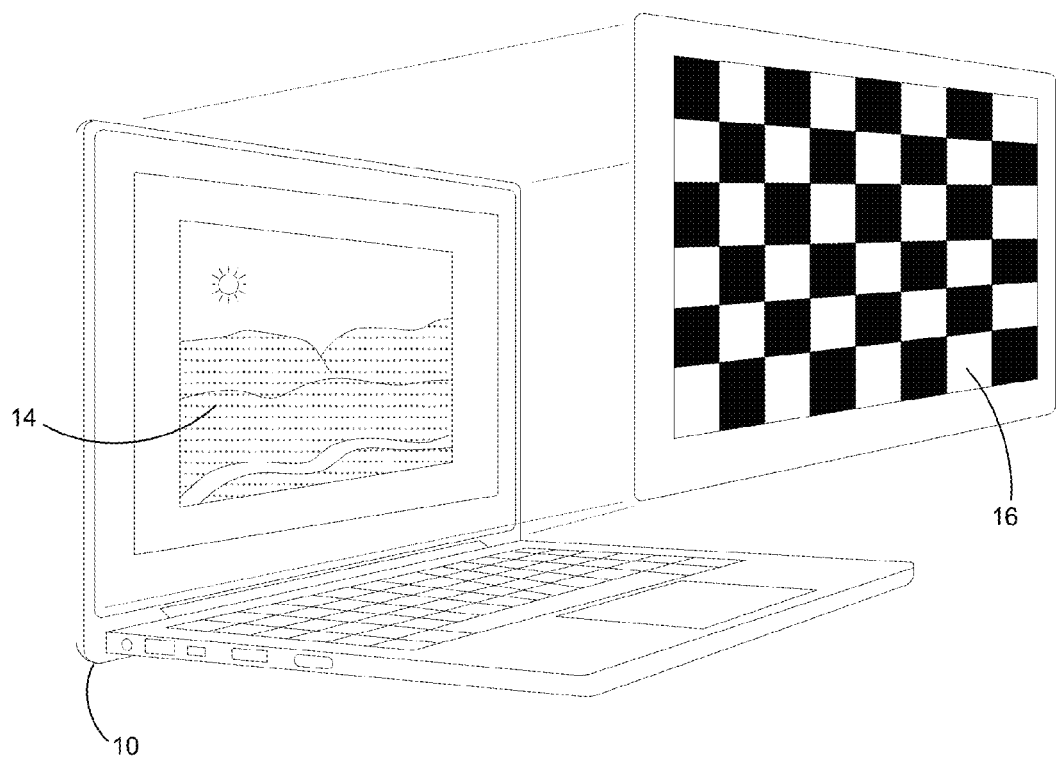
FIG. 2 is an example of a vision corrective display, according to various embodiments of the present disclosure.

In various embodiments, the vision corrective display 10 includes a rear display 14 and a front barrier display 16, as illustrated in an exploded manner in FIG. 2. In various embodiments, an image to be displayed is rendered on the rear display 14 while the front barrier display 16 functions to control which portions of the image displayed on the rear display 14 are visible to the viewer. The front barrier display 16 provides an adjustable barrier layer that allows selected portions of the image displayed on the rear display 14 to be viewed by the viewer. In one or more embodiments, the image displayed on the rear display 14 and the front barrier display 16 are adjusted in conjunction with one another (e.g., on a frame-by-frame basis or on a certain clock or timing cycle) so that the image being viewed remains in a desired focus or other visual appearance over time (e.g., when the image is a video having changing images or characteristics over time).

Figure 3A:
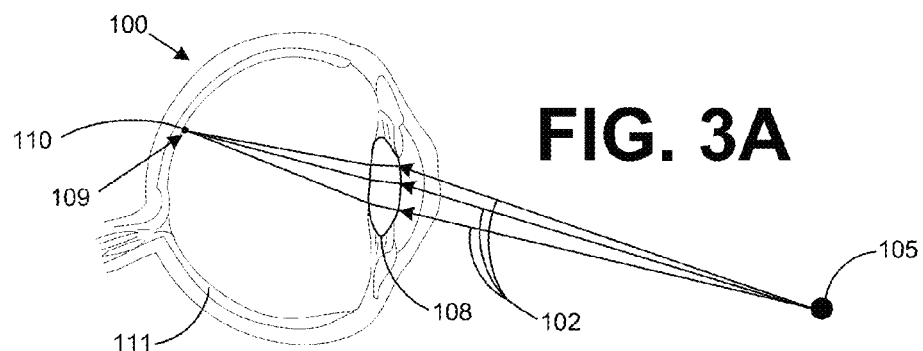
FIG. 3A is an optical diagram of light rays passing through portions of an eye with correct vision, according to various embodiments of the present disclosure.

In one or more embodiments, the functional operation of the vision corrective display 10 adjusts for visual impairments of a viewer, where an overview of some visual impairments and associated image adjustments performed by the vision corrective display 10 will now be described with reference to FIGS. 3A-3C and 4A-4C. With reference to FIG. 3A, shown is an optical diagram of light rays passing through portions of an eye 100 with correct vision. An object 105 is perceived by portions of an eye 100. The object 105 may comprise any light source that radiates light rays 102, where the object 105 may be, for example, a pixel rendered on a display. Light rays 102 emitted from the object 105 pass through a lens 108 of the eye 100. After passing through the lens 108, the light rays 102 converge toward a focal point 110 within the eye 100. For an eye 100 with unimpaired vision, the focal point 110 where the light rays 102 converge falls on the retina 111 of the eye 100. To this end, an object 105 that focuses on the retina 111 is perceived correctly with a reduced amount of blur.

Figure 3B:
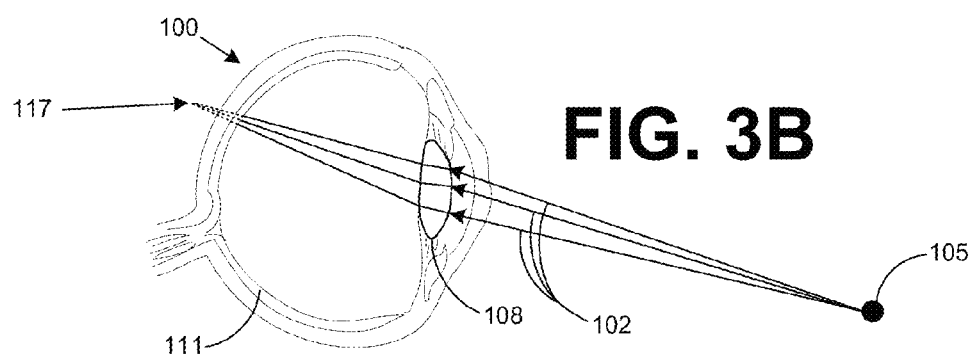
FIG. 3B is an optical diagram of light rays passing through portions of an eye with slightly impaired vision, according to various embodiments of the present disclosure.

Referring now to FIG. 3B, shown is an optical diagram of light rays 102 passing through portions of an eye 100 with slightly impaired vision. The non-limiting example of FIG. 3B depicts an eye 100 with poor vision attributed to hyperopia. The object 105 is still perceived by portions of the eye 100. However, after passing through the lens 108, the light rays 102 do not converge at the retina 111. Instead, the light rays 102 converge toward a focal point 117 located behind the retina 111. In various cases, the light does not converge at the retina 111 as a result of vision disorders affecting the eye and/or the shape of the eye, such as the reduced ability for the lens 108 to focus light on the retina 111. Since the light rays 102 corresponding to the object 105 received at the retina 111 do not converge at the retina 111, the object 105 will be perceived by the viewer as being out of focus or blurry, instead of being perceived as a sharp or in focus image.

Figure 3C:
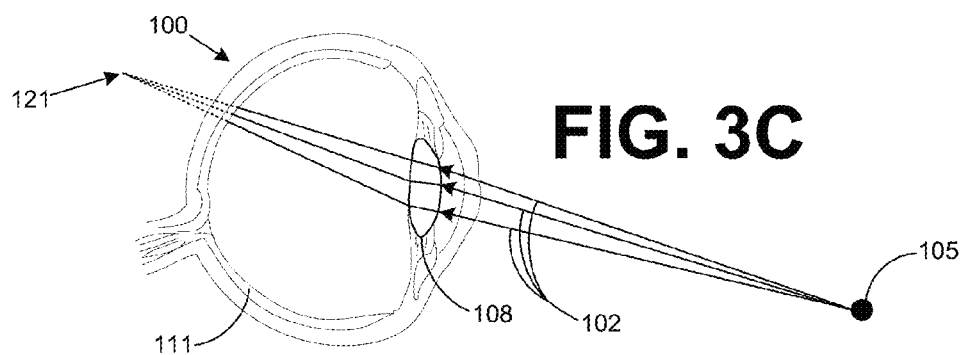
FIG. 3C is an optical diagram of light rays passing through portions of an eye with greater impaired vision than the eye depicted in FIG. 3B, according to various embodiments of the present disclosure.

Referring further to FIG. 3C, shown is an optical diagram of light rays 102 passing through portions of an eye 100 with even greater impaired vision than the eye depicted in FIG. 3B. The object 105 in FIG. 3C has a focal point 121 that falls farther behind the retina 111 than the focal point 117 that is depicted in FIG. 3B. Thus, the light rays 102 corresponding to the object 105 are even more spaced apart when received by the retina 111 in the eye 100 of FIG. 3C, resulting in an even greater degree of blurriness or out of focus image of the object 105 than in the eye of FIG. 3B.

In the context above, various embodiments of the present disclosure are directed to manipulating the manner in which the object 105 is presented on a vision corrected display 10 in order to modify the manner in which a viewer perceives the image so as to improve the focus of the object 105 and/or reduce the degree of blurriness perceived by a viewer's eye.

Figure 4A:
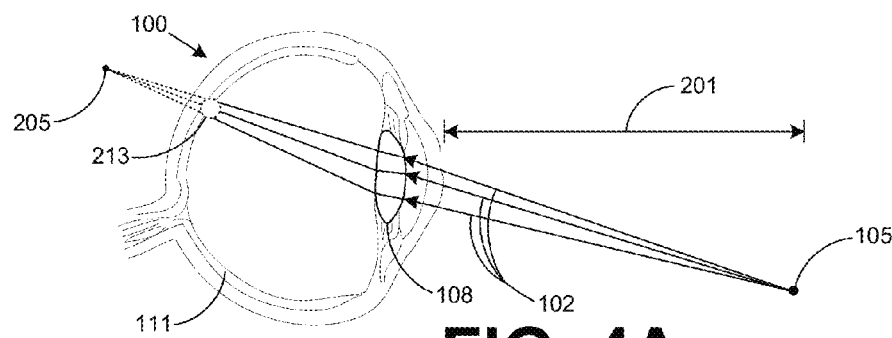
FIG. 4A is an optical diagram of light rays passing through portions of an eye that requires vision correction, according to various embodiments of the present disclosure.

With reference to FIG. 4A, shown is an optical diagram of light rays 102 passing through portions of an eye 100 that requires vision correction. An object 105 positioned a distance 201 away from the eye 100 emits light rays 102 that pass through the lens 108 of the eye 100, where the lens 108 focuses an image of the object 105 at a focal point 205. The focal point 205 falls behind the retina 111, thereby causing the object 105 to be out of focus to the viewer (e.g., represented by a blurred image 213 where the spaced apart light rays 102 are received by the retina 111 due to their convergence focal point 205 being located away from the retina 111). In this respect, the object 105 appears to be less sharp, larger, and blurrier for a person with poor vision having eyesight corresponding to FIG. 4A.

Figure 4B:
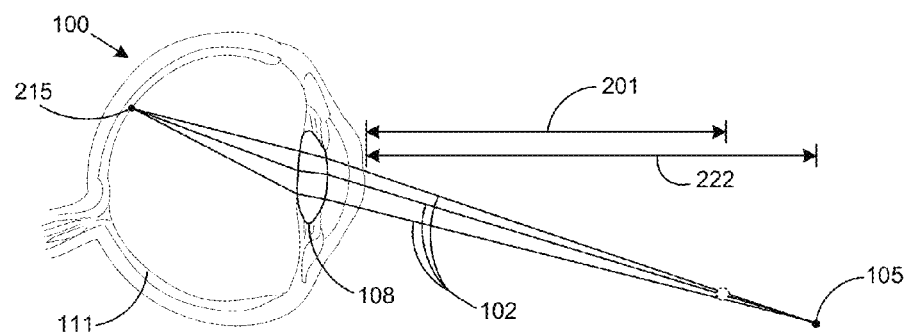
FIG. 4B is an optical diagram of light rays passing through portions of an eye that requires vision correction, according to various embodiments of the present disclosure.

With reference to FIG. 4B, shown is an optical diagram of light rays 102 passing through portions of the eye 100 of FIG. 4A that requires vision correction. FIG. 4B provides an example of where the object 105 should be positioned for a vision impaired viewer to correctly perceive the object 105 in focus (e.g., where the light rays 102 for the object 105 converge at a focal point 215 located on the retina 111). The non-limiting example of FIG. 4B depicts relocating an object 105 to achieve a focal point 215 that falls on the retina 111 of a viewer with poor vision. Specifically, for a person with poor vision who is not wearing corrective lenses, such as a person having the condition of hyperopia, the location of an object 105 should be moved from the original distance 201 further away from the viewer to a greater distance 222 to allow the visually impaired lens 108 of the eye 100 to focus the light rays 102 at a focal point 215. In other words, the distance 222 indicates where the object 105 should be located in order for the vision impaired viewer to observe the object 105 in focus. If the object 105 is not moved away from the viewer, the object 105 appears out of focus because the light rays 102 are received in a non-focused region 213 of the retina 111, as shown in FIG. 4A.

However, in the context of a display presenting images to a viewer (e.g., displaying images on a television display, computer display, hand held display, etc.), it may not be desirable or possible to adjust the location of the display screen with respect to the viewer in order to attempt to bring a displayed image into focus. Instead of physically moving the location of the display screen with respect to a viewer, in accordance with one or more embodiments of the present disclosure, the light rays corresponding to an object or image being viewed on the vision corrective display 10 can be controlled to manipulate how the light rays for the image are received and perceived by a viewer.

Figure 4C:
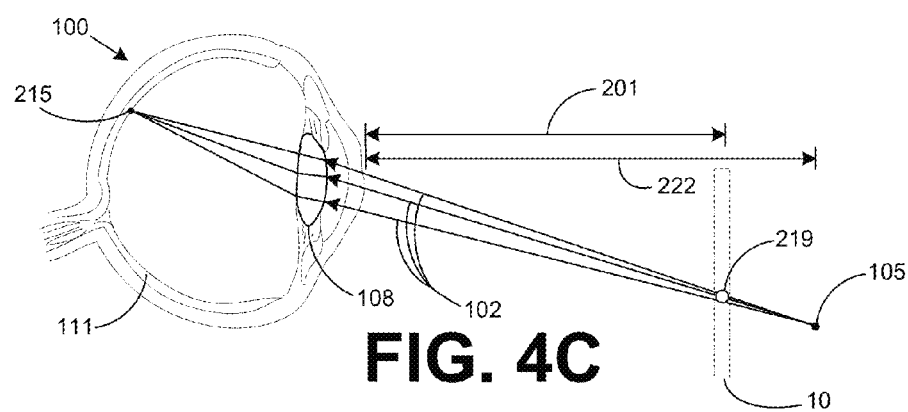
FIG. 4C is an optical diagram of light rays passing through portions of an eye that requires vision correction, according to various embodiments of the present disclosure.

Referring now to FIG. 4C, shown is an optical diagram of light rays 102 passing through portions of the eye 100 of FIGS. 4A and 4B that requires vision correction. Specifically, the non-limiting example of FIG. 4C demonstrates how a vision corrective display 10 operating in accordance with the present disclosure positioned at a display location 201 could alter the presentation of a vision corrected object 219 at distance 201 from the viewer's eye 100 (corresponding to object 105 positioned at a distance 222 from the viewer's eye 100) without requiring the vision impaired viewer to move the object 105 to a distance 222. As shown in FIG. 4C, the vision corrective display 10 is configured to modify, adjust, distort and/or expand the presentation of object 105 to the vision corrected object 219 shown on the display screen (e.g., at a distance 201). To this end, the display is configured to project the vision corrected object 219 in a manner that would place the vision corrected object 219 in correct focus at the display location 201, such that it appears as an in-focus image of the object 105 without having to physically move object 105 to a distance 222 away from the viewer's eye.

Figure 5:
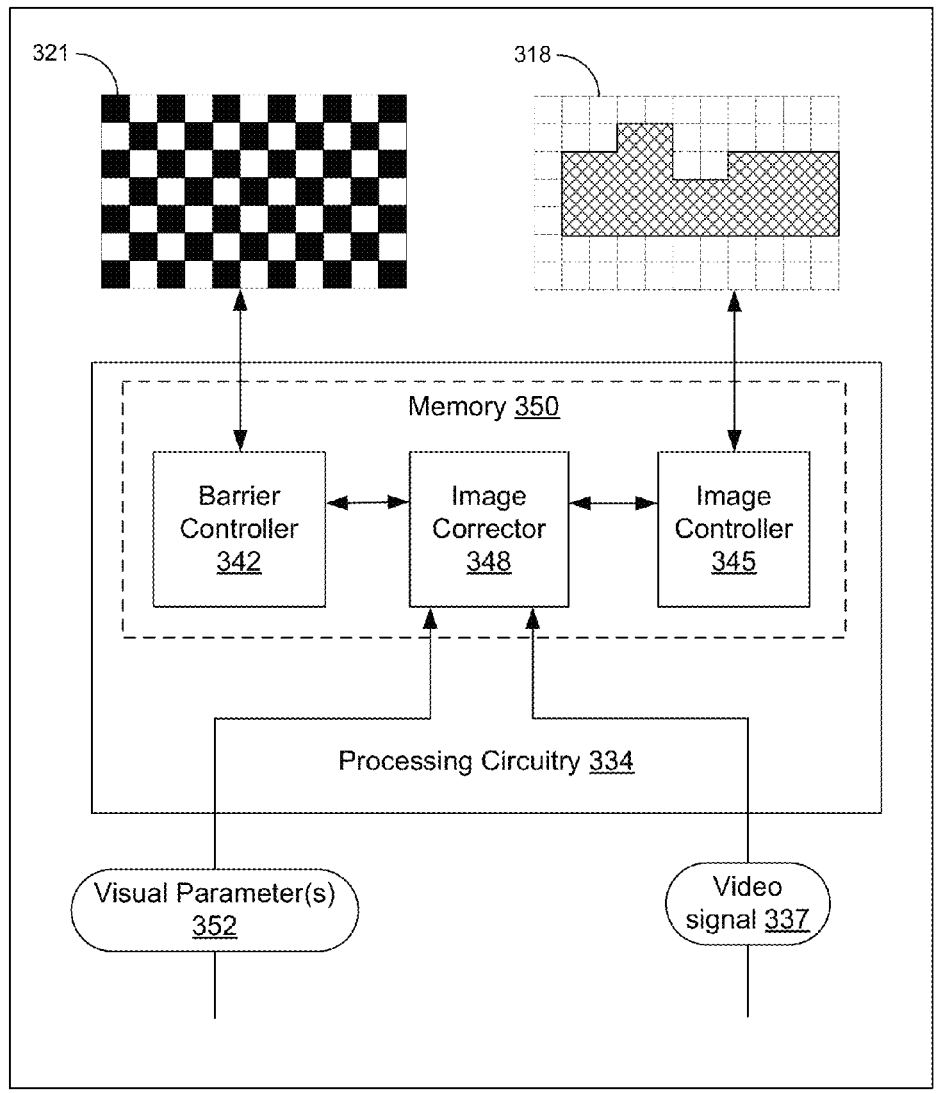
FIG. 5 is a drawing of an example of a vision corrective display, according to various embodiments of the present disclosure.

Referring now to FIG. 5, shown is a block schematic illustration of an example of a vision corrective display 303, according to various embodiments of the present disclosure. In one or more embodiments, the vision corrective display 303 may be described as being lensless in that it modifies the visual attributes of an image (e.g., brings an image into focus for a viewer) for a viewer without requiring a viewer to wear corrective lenses and/or without requiring a refractive lens on the display 303 itself that would refract light passing therethrough. In one or more embodiments, the vision corrective display includes a rear display 318 for displaying images and a barrier display 321 for selectively allowing light to pass there through or otherwise selectively allowing portions of the images displayed on the rear display 318 to be viewed by a viewer. In one or more embodiments, the rear display 318 and/or the barrier display 321 may comprise a liquid crystal display (LCD), a light emitting diode (LED) display, an organic-LED (OLED) display, a plasma screen or any other type of display screen or display device capable of displaying images. In various embodiments, the barrier display 321 operates in a manner that is similar to a parallax barrier layer by selectively directing light to a viewer. The barrier display 321 comprises a device for selectively creating a barrier to light passage between the rear display 318 and a viewer of the vision corrective display 303 so as to control the portions of the image(s) being displayed on the rear display 318 that can be viewed by a viewer of the vision corrective display 303 by blocking certain portions of light emitted from the rear display 318 from being seen by the viewer and by allowing other portions of light emitted from the rear display 318 to be seen by the viewer. In one or more embodiments, the barrier display 321 may be, for example, a barrier layer positioned to be in front of the rear display 318 with respect to the viewer. The vision corrective display 303 may, for example, correspond to the vision corrective display 10 illustrated in FIGS. 1 and 2.

According to various embodiments, the barrier display 321 may comprise a barrier layer that is removable or otherwise attachable/detachable to the rear display 318 or the vision corrective display 303. A removable embodiment of the barrier display 321 may allow any current display device to be modified (e.g., retrofitted) with the barrier display to achieve a vision corrective display, where the current display device could function in accordance with the rear display 318 described herein. The removable barrier display may be an attachable LCD screen that is controlled in conjunction with rear display 318. The removable barrier display may include one or more ports to allow for either wired or wireless connectivity with the rear display 318 and/or the processing circuitry 334 of vision corrective display 303. For example, for wireless connectivity, the removable barrier display may connect to the other components via any known wireless protocol such as but not limited to WLAN (e.g., IEEE 802.11), Bluetooth, NFC or other wireless protocols. In various embodiments, rather communicatively coupling the removable barrier display to the rear display 318, the removable barrier display and the rear display 318 can otherwise be synchronized to operate in concert with one another.

The vision corrective display 303 further comprises processing circuitry 334. In various embodiments, the processing circuitry 334 is implemented to include at least a portion of a microprocessor. In various embodiments, the processing circuitry 334 may include one or more circuits, one or more processors, application specific integrated circuits, dedicated hardware, digital signal processors, microcomputers, central processing units, field programmable gate arrays, programmable logic devices, state machines, or any combination thereof. In various embodiments, processing circuitry 334 may include one or more software modules executable by or within one or more processing circuits. The processing circuitry 334 may further include memory 350 configured to store instructions and/or code that causes the processing circuitry 334 to execute the functionality of the vision corrective display 303 described herein.

In various embodiments, the processing circuitry 334 receives a video signal 337 for processing and rendering for display to a viewer. The video signal 337 may comprise an image, a video stream made up of a series of images, graphics, textual information or other content that may be displayed on the rear display 318, referred to hereinafter as "display content." The display content may comprise, for example, an image, a picture or any other collection of pixels.

The processing circuitry 334 further comprises a barrier controller 342 for controlling the display of the barrier display 321, such as, for example, controlling the images or patterns being displayed on the barrier display 321 by blocking certain portions of light emitted from the rear display 318 from being seen by the viewer and by allowing other portions of light emitted from the rear display 318 to be seen by the viewer. The processing circuitry 334 comprises an image controller 345 for controlling images rendered by the rear display 318. In one or more embodiments, the processing circuitry 334 also includes an image corrector 348 for modifying, changing or replacing images expressed in a video signal 337 (e.g., to account for vision correction or other modification of visual attributes). The image corrector 348 is configured to receive or obtain visual parameters 352 associated with certain desired display characteristics for the vision corrective display 303. In one or more embodiments, the visual parameters 352 may comprise visual attributes for an image, a vision parameter for a viewer, a distance between the viewer and the vision corrective display 303, information used to determine a visual parameter, or any other parameter used for modifying, changing or replacing the video signal 337 (e.g., to provide a desired vision correction for a viewer). In one or more embodiments, a visual parameter 352 may comprise, for example, a corrective lens prescription of the viewer (e.g., a diopter value, etc.), a focal length value of the viewer's eye, and optical power of the viewer's eye, etc. In one or more embodiments, the visual parameter 352 may be input by a viewer of the vision corrective display 303 through an input source or input device 13 (FIGS. 1A and 1B) (e.g., keyboard, keypad, touch screen, remote control, camera, image sensor for gesture control, microphone with voice recognition for voice control, etc.). In one or more embodiments, the visual parameter 352 may be sensed by the vision corrective display 303, such as by using image and/or audio sensors to provide visual and/or audio recognition of a viewer to sense a viewer's location (e.g., distance, position, angle, etc.) with respect to the vision corrective display 303 or otherwise sense visual parameters of the viewer. The relative distance between the viewer and the vision corrective display 303 may be expressed in any units of distance that indicate how far away a viewer is from the vision corrective display 303. In one or more embodiments, the vision corrective display 303 may sense certain conditions in its surrounding environment (e.g., brightness, glare) and adjust one or more visual parameter 352 accordingly. In one or more embodiments, the visual parameter 352 may be provided together with the content contained in the video signal 337.

Next, a general description of the operation of the various components of the vision corrective display 303 is provided in accordance with one or more embodiments. The image corrector 348 and/or image controller 345 receive a video signal 337 that contains an image. The image corrector 348 and/or image controller 345 are configured to process the image based on visual parameters 352 and render it for display to a viewer, such that the rear display 318 and the barrier display 321 are controlled accordingly to modify the perception of the image to a viewer who has vision impairment so as to reduce or eliminate such impairment (e.g., bring the image into focus for the viewer). The image corrector 348 may also be configured to receive user input (e.g., as part of visual parameters 352) to determine the extent of vision correction needed to correct the image for display to the viewer.

According to various embodiments, the processing circuitry 334 may generate a user interface to calculate the visual parameter 352. For example, the user interface may perform an eye examination for identifying the severity of impaired vision of the viewer. For example, the eye examination may comprise controlling the rear display 318 and the barrier display 321 to present a series of images having different visual attributes (e.g., images associated with different viewer focal lengths that may range in blurriness to a viewer). The viewer may select the image containing the desired characteristics, such as the image that is perceived to be in focus the most to the viewer or the viewer may use an input source or input device 13 to adjust the visual attributes of the images until they possess desired characteristics. Each image may correspond to a respective visual parameter (e.g., a different corrective lens prescription). The selected image may then indicate a suitable visual parameter for the viewer, such that this visual parameter may be utilized by the image corrector 348 to control the rear display 318 and the barrier display 321 to adjust their displays, respectively, to associate all images with such visual parameter.

In performing image modification or correction, the image corrector 348 generates a signal to the image controller 345 for rendering a vision corrected image on the rear display 318. The image corrector 348 modifies, shifts, expands or otherwise distorts a received image based on the visual parameters 352. The distorted image is rendered on the rear display 318 via the image controller 345. In one or more embodiments, the particular pixels to be illuminated and/or the attributes of the individual pixels in the rear display 318 associated with the image to be displayed are modified by the image corrector 348 in accordance with the desired operation of the vision corrective display 303 to allow the image to be viewed in focus by a viewer.

In various embodiments, the image corrector 348 generates a signal to the barrier controller 342 for controlling operation of the barrier display 321 to effectuate vision correction of the image. In various embodiments, the barrier display 321 may be in a substantially transparent state when images are not being displayed and operation of the barrier display 321 will be described as displaying a desired pattern on the barrier display 321 that functions to block certain portions of light emitted from the rear display 318 from being seen by the viewer and by allowing other portions of light emitted from the rear display 318 to be seen by the viewer, such that only certain portions of the image displayed on the rear display 318 can be seen by a viewer and these visible portions of the image contain the desired visual attributes for the viewer. While the image displayed on the barrier display 321 may be described as a desired pattern in various embodiments described herein, it is understood that the barrier display 321 may control the ability of a viewer to view certain portions of the rear display 318. In one or more embodiments, the pattern displayed on the barrier display 321 may completely block the passage of light through certain regions of the barrier display 321 displaying the pattern while allowing light to pass through other regions of the barrier display 321 on which the pattern is not displayed. In one or more embodiments, the pattern displayed on the barrier display 321 may not completely block the passage of light through certain regions of the barrier display 321 displaying the pattern but may instead simply modify the characteristics of the light passing therethrough, so as to adjust the visually perceivable characteristics of the image being displayed on the rear display 318 (e.g., the barrier display 321 may serve as a type of light filter in certain situations).

In one or more embodiments, the image corrector 348 instructs the barrier controller 342 to render a dynamically changeable pattern on the barrier display 321 for selectively directing light that is emitted from the rear display 318 towards the viewer. In this manner, the images displayed on the rear display 318 and the patterns displayed on the barrier display 321 are coordinated by the barrier controller 342, image corrector 348 and/or image controller 345 to work in conjunction with one another to create the desired visual effect for the viewer. In one or more embodiments, the image corrector 348, barrier controller 342 and/or image controller 345 may be configured to adjust the altered image to be displayed on the rear display 318 and/or the dynamic pattern that is rendered by the barrier display 321 based on the visual parameters 352 and/or particular images present in the video signal 337. In one or more embodiments, the image corrector 348, the barrier controller 342 and the image controller 345 may comprise separate components, may comprise the same component, may combine some components or may have their operations divided among even additional components.

Figure 6A:
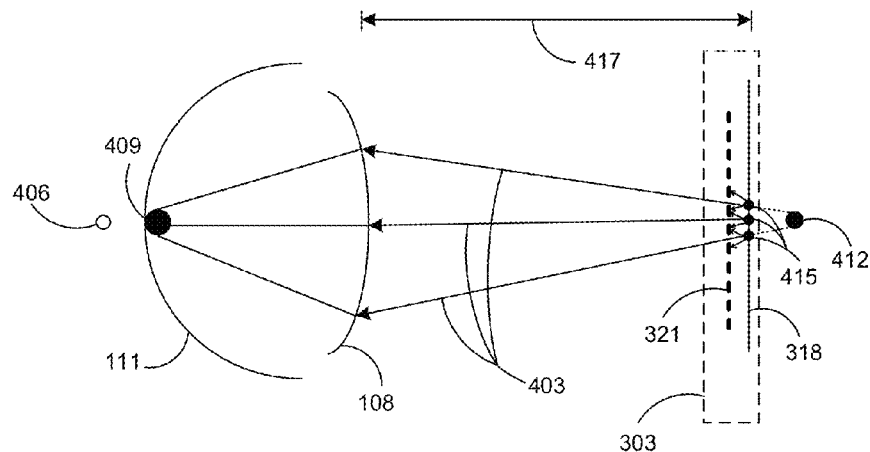
FIG. 6A is an optical diagram of light rays emitted from the vision corrective display of FIG. 5 observed by a viewer with slightly impaired vision, according to various embodiments of the present disclosure.

Referring next to FIG. 6A, shown is an optical diagram of light rays 403 emitted from a vision corrective display 303 of FIG. 5 observed by a viewer having impaired vision. In the non-limiting example of FIG. 6A, the vision corrective display 303 is configured to create an in-focus corrected image for the viewer, which otherwise would be perceived by the viewer to be out of focus as a result of the viewer's impaired vision having a focal point 406 located behind the viewer's retina 111 for an image viewed a distance 417 from the viewer's eye. As a result, images rendered by this display without correction would appear to be out of focus and blurry to the viewer based on the viewer's vision impairment.

According to various embodiments, the vision corrective display 303 of the present disclosure is directed to account for the vision impairment of the viewer by causing images rendered by the vision corrective display 303 to converge at a focal point 409 located at the retina 111, thereby causing the images to be perceived in-focus. Assuming that the viewer wishes to correctly perceive a hypothetical object 412, the hypothetical object 412 would, for example, need to be displayed on a display 303 as if it were located at a position located behind the vision corrective display 303 to account for the particular viewer's vision impairment.

In view of the display distance 417 between the display 303 and the viewer's eye being different than the distance to the hypothetical object 412 needs to be positioned for make the hypothetical object 412 appear in focus to the viewer without corrective lenses, the vision corrective display 303 is configured to adjust the presentation of the hypothetical object 412. That is, the vision corrective display 303 generates a vision corrected object 415 by modifying the hypothetical object 412 for display on the vision corrective display 303 to appear in focus to the viewer (e.g., modifying the hypothetical object 412 so that it is perceived in focus whereas simply displaying the hypothetical object 412 on the rear display 318 in an unmodified manner would appear out of focus due to the viewer's visual impairment). For example, the vision corrective display 303 modifies a presentation of the hypothetical object 412 by shifting, expanding, or otherwise distorting presentation of the hypothetical object 412 on the rear display 318. Expanding may comprise, for example, taking a hypothetical object 412 to be displayed and reproducing the object 412 into one or more reproduced versions 415 of the object 412 as depicted in FIG. 6A. In one or more embodiments, the reproduced versions 415 may be shifted on the rear display 318 when displayed. In one or more embodiments, expanding may also comprising scaling the size of the hypothetical object 412 along one or more axes. In various embodiments, an image corrector 348 (FIG. 5) is operable to cause a modification, an expansion or distortion to render the vision corrected object(s) 415.

In addition to generating a vision corrected object 415, the vision corrective display 303 may be further configured to direct different portions of the vision corrected object 415 to the viewer at different points in time. To direct portions of the vision corrected object 415, the vision corrective display 303 may comprise a rear display 318 and a barrier display 321. The rear display 318 may comprise, for example, a Liquid Crystal Display (LCD), a gas plasma-based flat panel display, an organic light emitting diode (OLED) display, an LCD projector, or other type of display device for rendering images. Specifically, the rear display 318 may be configured to render the vision corrected object 415.

The barrier display 321 may comprise, for example, an LCD), a gas plasma-based flat panel display, an organic light emitting diode (OLED) display, an LCD projector, or other type of display device for rendering images that may selectively block/transmit the passage of light originating from the rear display 318. Thus, the barrier display 321 may selectively allow or prevent or alter the passage of light generated by the rear display 318 to control which portions of the vision corrected object 415 are received by the retina 111. Through the use of the barrier display 321 and the rear display 318, images rendered by the vision corrective display 303 arrive at a suitable focal point on the retina 111 of the vision impaired viewer.

In one or more embodiments, the vision corrective display 303 may use a barrier controller 342 (FIG. 5) to render patterns via the barrier display 321 and use an image controller 345 (FIG. 5) to render images via the rear display 318.

Figure 6B:
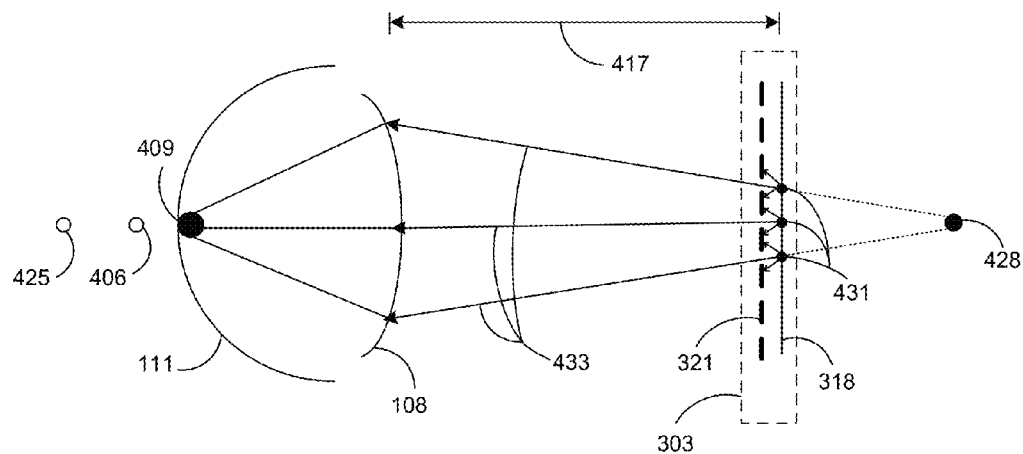
FIG. 6B is an optical diagram of light rays emitted from the vision corrective display of FIG. 5 observed by a viewer with greater impaired vision than the viewer depicted in FIG. 6A, according to various embodiments of the present disclosure.

Referring next to FIG. 6B, shown is a non-limiting example of an optical diagram of light rays 433 emitted from a vision corrective display 303 observed by a viewer having impaired vision who experiences a condition of hyperopia that is more extreme than the case depicted in the non-limiting example of FIG. 6A. In this example, images normally rendered on a display at a distance 417 would focus at a focal point 425 even further behind the viewer's retina 111. As a result, unmodified images rendered on a display at this distance would appear to be out of focus and blurry to the viewer without corrective lenses. Moreover, when compared to the non-limiting example of FIG. 6A, the focal point 425 of FIG. 6B is further deviated from the retina 111 than the focal point 406 of FIG. 6A. To account for this further deviation, a hypothetical object 428 would be required to be placed even further away from the viewer than that which is represented in FIG. 6A in order for the viewer to view the unmodified hypothetical object 428 in focus.

Because the viewer in FIG. 6B experiences even greater impaired vision than the viewer of FIG. 6A, in one or more embodiments the vision corrected object 431 should be distorted to a greater extent than that which is depicted in FIG. 6A (e.g., by selecting different pixels having a different location, spacing, pattern or characteristics to be illuminated in comparison to FIG. 6A). According to various embodiments, the vision corrected object 431 may comprise one or more reproduced versions 431 of the hypothetical object 428 that are offset from each other along a horizontal axis and/or vertical axis. The offset may be based on the severity of the impaired vision. Moreover, the number of reproduced versions may also depend at least upon the severity of the impaired vision. For example, the greater the severity in vision impairment, the greater the degree of expansion and the greater the number of reproduced versions to achieve the greater degree of expansion.

Figure 7A:
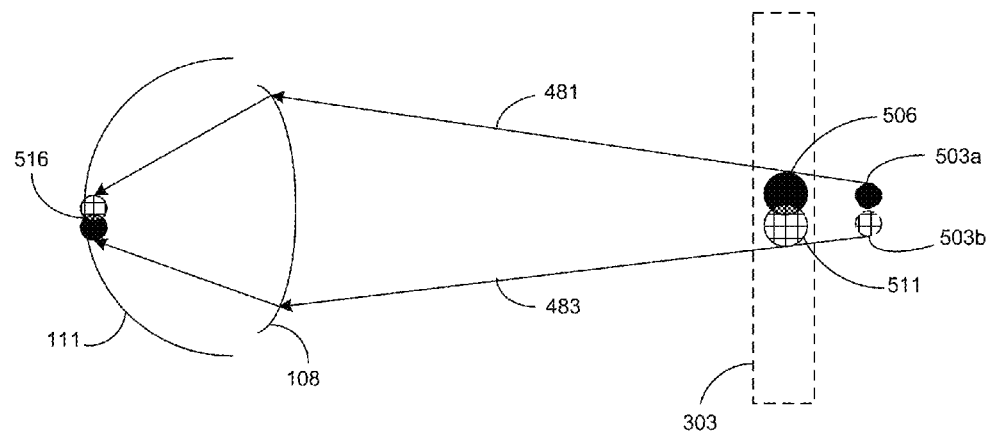
FIGS. 7A and 7B are optical diagrams of light rays of multiple objects emitted from a vision corrective display of FIG. 5 observed by a viewer who requires vision correction, according to various embodiments of the present disclosure.

With reference to FIG. 7A, shown is an optical diagram of light rays 481, 483 of multiple hypothetical objects 503a, 503b rendered by a vision corrective display 303 in accordance with one or more embodiments as observed by a viewer who requires vision correction. FIG. 7A depicts vision correction before light emitted from the vision corrective display 303 is selectively directed to the viewer at varying points in time. Specifically, the non-limiting example of FIG. 7A depicts a vision corrective display 303 that is configured to present multiple objects such as, for example, a first object 506 and a second object 511.

In one or more embodiments, there may exist situations where, when multiple objects 503a, 503b to be displayed are modified to be displayed as vision corrected objects 506 and 511 on the vision corrective display 303, it may be the case that multiple vision corrected objects 506 and 511 overlap with one another when presented on the rear display 318 of the vision corrective display 303. If not accounted for, the resulting image 516 in the eye of the viewer could be blurry because the eye could be unable to separate and distinguish the overlapping multiple vision corrected objects 506, 511 as separate objects 503a, 503b. In this respect, the edges may be blurred, particularly in the case when the vision corrected objects 506, 511 are made up of different colors. To account for this, the vision corrective display 303 may be configured to selectively direct portions of the multiple vision corrected objects 506, 511 to the viewer's eye so that they can be perceived separately, as is shown in one example in FIG. 7B.

Figure 7B:
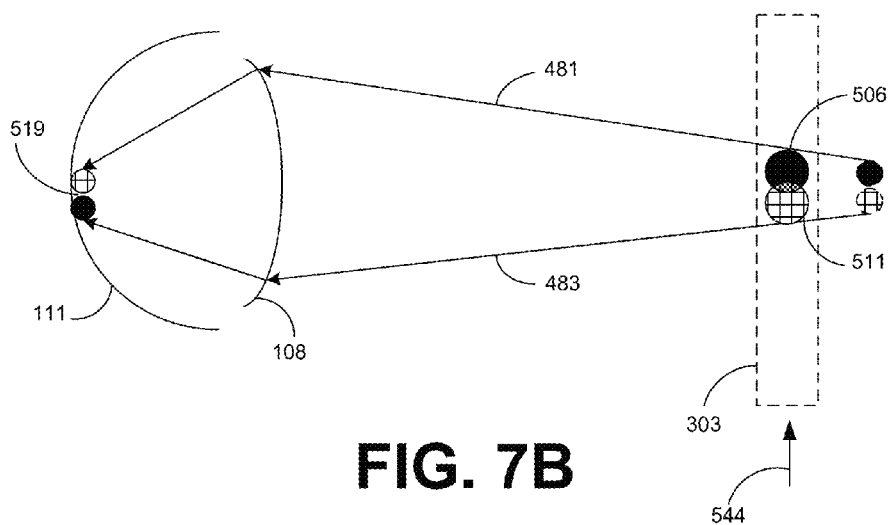

With reference to FIG. 7B, shown is an optical diagram of light rays 481, 483 of multiple objects 506 and 511 emitted from a vision corrective display 303 of FIG. 5 observed by a viewer who requires vision correction. In one or more implementations, FIG. 7B depicts vision correction after light emitted from the vision corrective display 303 is selectively directed to the viewer at varying points in time. For example, a barrier layer may be utilized for barrier display 321 (as shown in FIG. 5) to selectively direct light emitted by the vision corrective display 303 toward a viewer.

The non-limiting example of FIG. 7B depicts multiple vision corrected objects 506, 511 that are projected by a vision corrective display 303 at a display location 544 (i.e., rear display 318). By selectively directing portions of the multiple vision corrected objects displayed on the rear display 318 at varying points in time, the light rays 481, 483 received at the retina 111 of the vision impaired viewer such that the perceived image(s) 519 are perceived with reduced blurriness with relatively distinct edges.

Figure 8A:
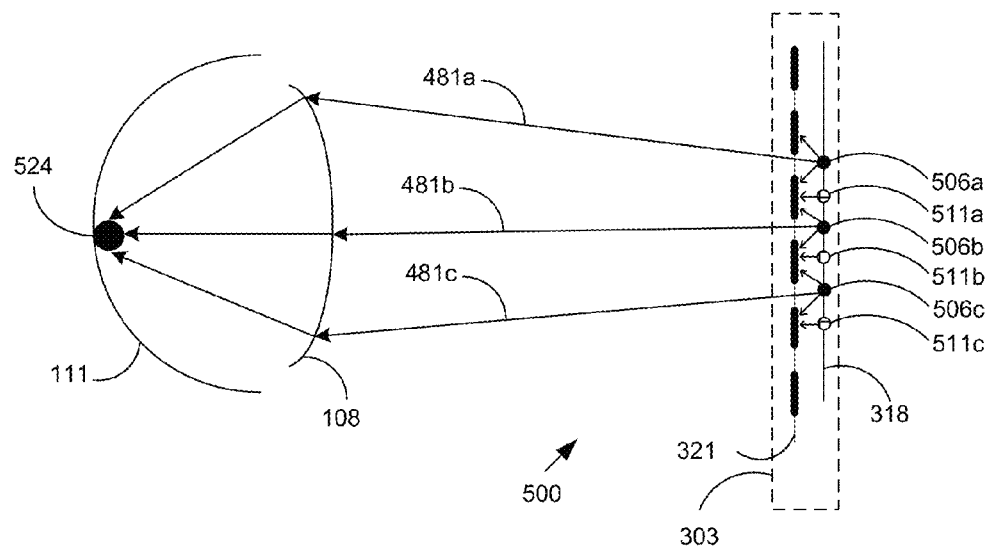
FIGS. 8A and 8B are optical diagrams of light rays emitted from multiple objects of FIGS. 7A and 7B rendered on a vision corrective display of FIG. 5 observed by a viewer who requires vision correction, according to various embodiments of the present disclosure.
Figure 8B:
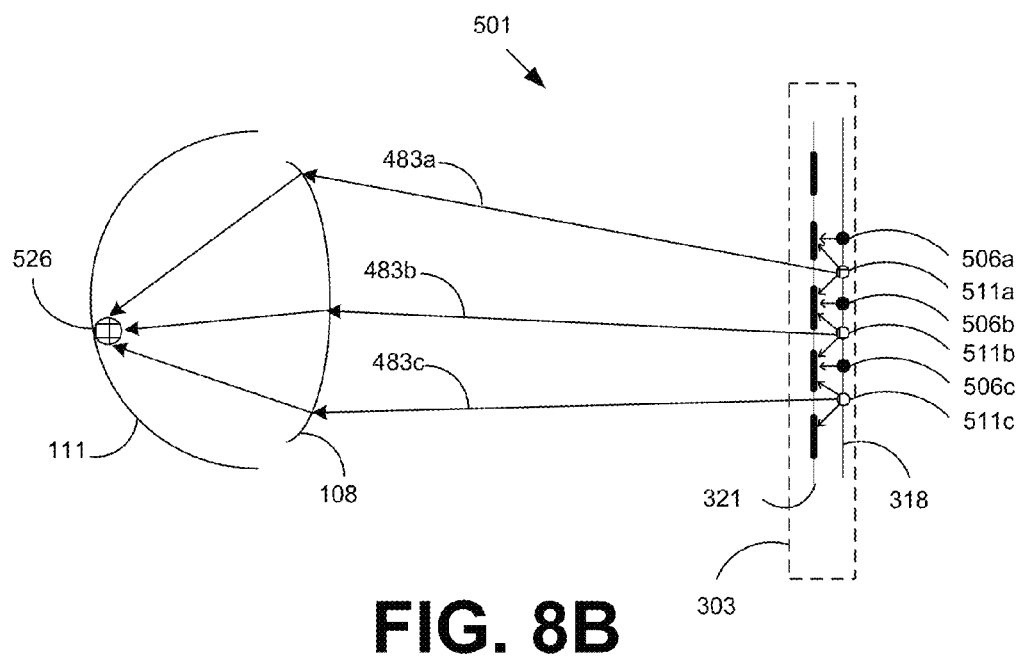

With reference to FIGS. 8A and 8B, shown is an optical diagram of light rays 481, 483 emitted from multiple objects rendered on a vision corrective display 303 of FIG. 5 in accordance with one or more embodiments in which the vision corrective display 303 modifies the displayed objects to account for a viewer who requires vision correction. Specifically, the non-limiting examples of FIGS. 8A and 8B depict the use of a barrier display 321 to selectively direct portions of light 481, 483 emitted by a rear display 318 toward a viewer, such as by selectively blocking certain portions of light emitted from the rear display 318 from being seen by the viewer while allowing other portions of light emitted from the rear display 318 to be seen by the viewer at varying points in time. The resulting image 524, 526 perceived by a viewer is visually corrected (e.g., possesses reduced or eliminated blurriness) because the light rays 481, 483 selected to be directed to the viewer converge at the viewer's retina 111.

FIG. 8A depicts a first barrier configuration 500 for displaying objects on the vision corrective display 303 and FIG. 8B depicts a second barrier configuration 501 for displaying objects on the vision corrective display 303. In one or more embodiments, the first and second barrier configurations 500, 501 may represent different respective versions of the same image or content to be displayed, where the first barrier configuration 500 may be configured to direct light 481a-c toward a viewer based on a first visual setting (e.g., a certain focal setting or eyesight configuration) while the second barrier configuration 501 may be configured to direct light 483a-c toward a viewer based on a second visual setting (e.g., a different focal setting or eyesight configuration).

In one or more embodiments, the rear display 318 and the barrier display 321 are controlled to operate in concert with one another according to the configuration of the vision corrective display 303. For example, for the same underlying content to be displayed, the rear display 318 and the barrier display 321 may be configured to operate in a first manner to display the content (e.g., first barrier configuration 500 of FIG. 8A) and/or may be configured to operate in a different manner to display the same content (e.g., second barrier configuration 501 of FIG. 8B). In one or more embodiments, the vision corrective display 303 is configured to selectively render objects on certain portions of the rear display 318 while selectively activating corresponding portions of the barrier display 321 to either block the passage of light 481, 483 or allow the passage of light 481, 483, so as to control which light rays 481, 483 are directed to the viewer. In the examples illustrated in FIGS. 8A and 8B, two different vision corrected objects 506 and 511 may be presented on the rear display 318 such that different respective areas of the barrier display 321 may be activated to allow a viewer to view one vision corrected object 506 or another vision corrected object 511, according to configurations of the vision corrective display 303.

In one or more embodiments, the first vision corrected object 506 may be generated by modifying the display characteristics of an object or content to be displayed, such as by shifting the location of the object on the rear display 318 in any direction (i.e., vertical, horizontal and/or both), expanding or reducing the size of the object, modifying the location or locations where the object is to be displayed, distorting the object, etc. To this end, the first vision corrected object 506 may comprise multiple reproduced images 506a-c that are offset with respect to one another. The multiple reproduced images 506a-c may be intended to be perceived individually or, alternatively, may be intended to be perceived by a viewer in combination to perceive the image 506. Similarly, the second vision corrected object 511 may also be generated in a similar manner to image 506, such that the second vision corrected object 511 may comprise multiple reproduced images 511a-c that are offset with respect to one another on the rear display 318. Different respective portions of the barrier display 321 may then be activated in a corresponding manner based on the first and second barrier configurations 500, 501 to either allow light rays 481a-c associated with multiple reproduced images 506a-c to converge on the retina 111 of a viewer to perceive a first vision corrected object 506 or to allow light rays 483a-c associated with multiple reproduced images 511a-c to converge on the retina 111 of a viewer at 526 to perceive a second vision corrected object 511.

In one or more embodiments, the first and second barrier configurations 500, 501 may represent images to be displayed at respective first and second points in time (i.e., different images or content having different intended focal points). The barrier pattern selectively created by the barrier display 321 may oscillate or cycle between the first barrier configuration 500 and the second barrier configuration 501 according to a clock. The first point in time may correspond to a first clock cycle and the second point in time may correspond to a second clock cycle. In various embodiments of the present disclosure, a clock oscillates between even clock cycles and odd clock cycles such that the first barrier configuration 500 is used on even clock cycles while the second barrier configuration 501 is used on the odd clock cycles. To this end, light that is emitted by the rear display 318 passes through the barrier display 321 at a rate that is based on the clock cycle frequency. The clock cycle frequency may be set to be greater than the fastest frame rate that a human eye may perceive.

In one or more embodiments, such adjustment and control of the barrier display 321 may be performed to direct respective light rays to the left and right eyes of the viewer in alternate clock cycles. By selectively directing different light (e.g., images or content to be perceived) to different eyes of the viewer, the vision corrective display 303 can be configured to account for different visual impairments that may exist between the viewer's left and right eyes. For example, it is common for a person to have a dominant eye or to have eye disorders or impairments that manifest differently between a person's left and right eyes. By selectively directing left eye images to a viewer's left eye and right eye images to a viewer's right eye during different clock cycles, the vision corrective display 303 is able to account for individual left and right eye impairments of a viewer. Furthermore, in one or more embodiments, the vision corrective display 303 may selectively direct left eye images to a viewer's left eye and right eye images to a viewer's right eye during different clock cycles so as to create a stereoscopic or 3D effect, without requiring a viewer to even wear stereoscopic or 3D glasses. Conventionally, stereoscopic or 3D glasses (e.g., those with active shutters or passive filters) have been required in order to avoid crosstalk between the viewer's two eyes and prevent left eye images from being seen by a viewer's right eye and right eye images from being seen by a viewer's left eye. In accordance with various embodiments, the selective control and direction of images by the vision corrective display 303 can avoid this crosstalk between a viewer's eyes by precisely controlling the light (and respective images) sent to each of the viewer's right and left eyes. In one or more embodiments, left and right eye content can be presented simultaneously on the vision corrective display 303 (through precise light direction) or may presented in alternating clock cycles.

In one or more embodiments, in order to control the particular content displayed on the rear display 318 that is directed to a viewer's eyes, the barrier display 321 may render a dynamic pattern that changes based on particular configurations of the vision corrective display 303. For example, the barrier configuration 500, 501 may comprise a geometric shape or pattern (e.g., stripes, checkerboard pattern) or other non-uniform configurations that are made of different types of regions on the barrier display 321: opaque regions, transparent regions and/or semi-opaque or semi-transparent regions. Each region in the barrier configuration may be made up of one pixel or a block of multiple pixels in any size array, depending upon the particular desired barrier to be created. In alternative embodiments, the regions of the barrier configuration may be configured to a honeycomb shape, circle, oval, polygon, or any other geometric shape that is capable of being displayed on the barrier display 321. In this respect, each geometric shape possesses either opaque or transparent characteristics.

In one or more embodiments, the first barrier configuration 500 may comprise a first barrier pattern to be displayed on the barrier display 321 while the second barrier configuration 501 comprises a second barrier pattern to be displayed on the barrier display 321 with respect to the first barrier configuration 500. In one or more embodiments, the second barrier pattern may be an inverse of the first barrier pattern. For example, if the first barrier configuration 500 is a checkerboard pattern, then the second barrier configuration 501 may be an inverse checkerboard pattern. To this end, a square represented in the barrier display 321 oscillates between opacity and transparency according to a clock frequency. By using a dynamic pattern that oscillates between a first barrier configuration 500 and a second barrier configuration 501, in some embodiments the image received by the retina 111 is made up of two separated images rather than a single blended image, thereby providing the eye with an image that has an improved resolution.

In the first barrier configuration 500, the barrier display 321 permits portions of the first vision corrected object 506 to reach the viewer's retina 111 while blocking portions of the second vision corrected object 511 from reaching the viewer's retina 111. At another point time, the barrier display 321 is configured to the second barrier configuration 501 to permit portions of the second vision corrected object 511 to reach the viewer's retina 111 while blocking portions of the first vision corrected object 506 from reaching the viewer's retina 111. In one or more embodiments, by switching the configuration of the barrier display 321 back and forth between the first barrier configuration 500 and the second barrier configuration 501, the viewer perceives two separated images that correspond to the first vision corrected object 506 and the second vision corrected object 511, respectively.

While various embodiments described herein describe first and second barrier configurations 500, 501 for ease of illustration of representative examples, it is understood that any number of barrier configurations may be variably generated in correspondence with the particular content being displayed on the rear display 318 at any given time.

Figure 9A:
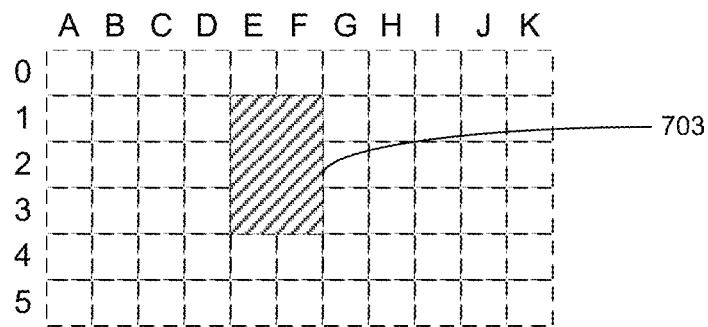
FIG. 9A is a drawing of an example of an object rendered on a rear display layer of FIG. 5 before the object is subjected to vision correction, according to various embodiments of the present disclosure.

Turning now to FIG. 9A, shown is a drawing of an example of an object 703 rendered on a rear display 318 of FIG. 5 before the object 703 is subjected to vision correction. The rear display 318 includes a matrix of rows (e.g., rows 0-5) and columns (e.g., columns A-K) that make up a matrix of display cells (e.g., A0, A1, A2 ... K5, etc.). For example, each display cell may be a pixel in the rear display 318, where an object 703 may be rendered on the rear display 318 using any number of pixels. For a viewer without impaired vision, no vision correction is needed. Thus, the viewer accurately perceives the object in FIG. 9A as it is rendered on the rear display 318. The object 703 of the example of FIG. 9A is rendered using the pixels E1, E2, E3, F1, F2, and F3.

Figure 9B:
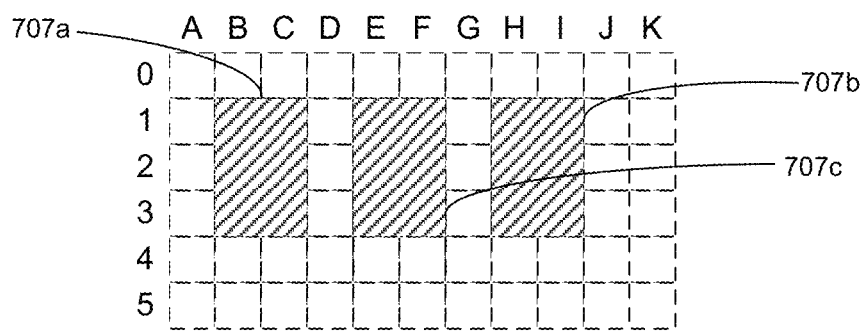
FIG. 9B is a drawing of an example of the object of FIG. 9A rendered on a rear display layer of FIG. 5 after the object is subjected to vision correction, according to various embodiments of the present disclosure.

Referring now to FIG. 9B, shown is a drawing of an example of the object 703 of FIG. 9A rendered on a rear display 318 of FIG. 5 after the object 703 is subjected to one possible modification to account for vision correction. If a viewer has impaired vision, then the object 703 rendered by the rear display 318 is subjected to vision correction. The particular modification of the display of the object 703 will be selected based on the type and/or degree of vision correction that is required for a particular viewer, such as being based on a visual parameter such as an eye power of the viewer or any other vision prescription metric. By applying an appropriate vision correction to the object 703 (e.g., based on visual parameters 352), the object 703 may be displayed in a different manner on the rear display 318. In various embodiments, the object 703 is reproduced to generate reproduced versions 707 (e.g., 707a, 707b, 707c) of the object 703 at selected locations on the rear display 318. The reproduced versions 707a, 707b, 707c are displayed at different locations with respect to one another, where the different locations may be selected based on the visual parameters 352. In some embodiments, the reproduced versions 707a, 707b, 707c may be offset with respect to one another in any direction, where the offset amount may be based on the visual parameters 352. For example, a viewer with poor vision may require a relatively small offset while viewers with very poor vision may require a relatively greater offset. To this end, reproduced versions 707 of the original object 703 effectively provide different locations on the rear display 318 to display the original object 703 such that the vision corrective display 303 allows a viewer to view and perceive the original object 703 with appropriate vision correct (e.g., a viewer can view the original object 703 in focus when displayed in a different manner on the rear display 318 with light direction functionality provided by the barrier display 321).

Although the non-limiting example of FIG. 9B depicts expanding an object along the horizontal axis, various embodiments of the present disclosure are directed to expanding an object in the horizontal axis as well as the vertical axis or a combination of both axes. Moreover, the display of the expanded object 707 may occur over the course of multiple display cycles. That is to say, the reproduced versions 707a, 707b, 707c may be displayed at varying points in time.

Figure 9C:
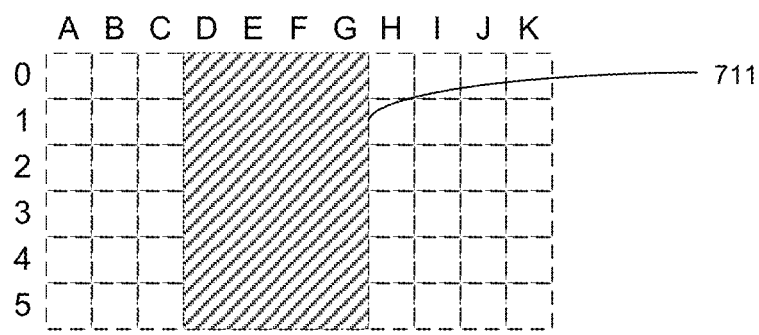
FIG. 9C is a drawing of an example of the object of FIG. 9A rendered on a rear display layer of FIG. 5 after the object is subjected to vision correction, according to various embodiments of the present disclosure.

Referring now to FIG. 9C, shown is a drawing of an example of the object of FIG. 9A rendered on a rear display 318 of FIG. 5 after the object is subjected to vision correction. Specifically, FIG. 9C demonstrates an example of expanding the object of FIG. 9A by scaling the size of the object to generate a scaled object 711. The object may be scaled to enlarge or reduce the size of the original object 703 along the horizontal and/or vertical axes. In the example of FIG. 9C, the scaled object 711 has been expanded to occupy a greater number of display cells or pixels than the original object 703.

Furthermore, the scaling of an object for vision correction may be made based on the visual parameters 352, including but not limited to cylindrical curvature of the viewer's eye. For example, the scaling along the horizontal axis may differ from the scaling along the vertical axis in order to account for different vision impairments that affect different viewers (e.g., differing cylinder values of different viewers' eyes).

Figure 10A:
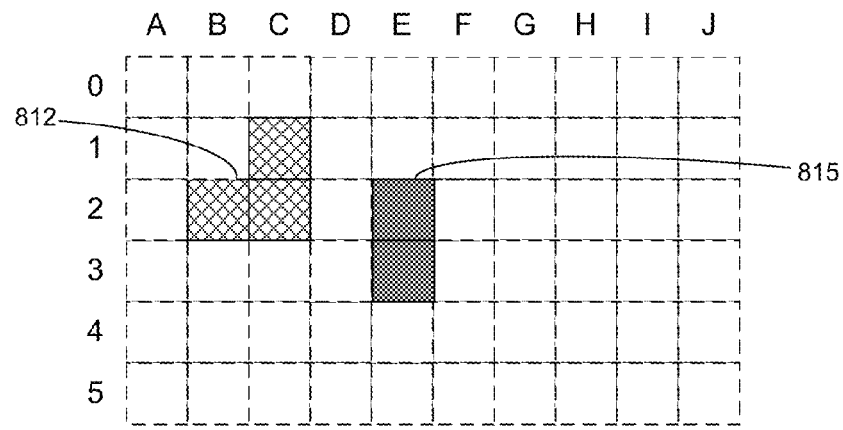
FIG. 10A is a drawing of an example of two objects rendered on a rear display layer of FIG. 5 before the objects are subjected to vision correction, according to various embodiments of the present disclosure.

Referring now to FIG. 10A, shown is a drawing of an example of two objects 812 and 815 rendered on a rear display 318 of FIG. 5 before the objects are subjected to vision correction. The rear display 318 includes a matrix of rows (e.g., rows 0-5) and columns (e.g., columns A-J) that make up a matrix of display cells (e.g., A0, A1, A2 . . . J5, etc.). It is understood that the particular number of rows and columns (i.e., resolution) that make up the matrix of display cells may vary based on the particular displays being utilized in the vision corrective display (e.g., being used for the rear display 318 and/or the barrier display 321). An object may be rendered on the rear display 318 using any number of pixels. For a viewer without impaired vision, no vision correction is needed. Thus, the viewer accurately perceives the object in FIG. 10A as it is rendered on the rear display 318. FIG. 10A provides an example of displaying a first object 812 and a second object 815.

Figure 10B:
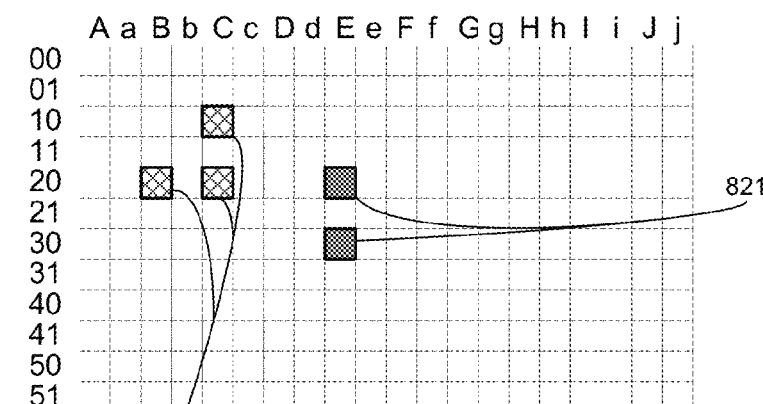
FIG. 10B is a drawing of an example of the object of FIG. 10A rendered on a rear display layer of FIG. 5, according to various embodiments of the present disclosure.

Referring now to FIG. 10B, shown is a drawing of an example of the first object 812 (FIG. 10A) and second object 815 (FIG. 10A) rendered on a rear display 318 of FIG. 5. According to various embodiments, the rear display 318 may comprise a high resolution display such as, for example, an Ultra HD display (i.e., 4K×2K), an 8K×bK display or any high resolution display. A high resolution display may be any display that has a pixel density that is greater than a display with lower resolution. For example, a 4K×2K display has approximately four times higher resolution than a conventional HD quality display (i.e., 1920×1080 pixels) by doubling the number of pixels in each direction, and an 8K×4K display has approximately sixteen times higher resolution than a conventional HD quality display. As display technologies advance, higher and higher resolutions will continue to be achievable. These higher resolutions provide flexibility in modifying the objects or content to be displayed through the use of all of the available pixels in the higher resolution, while still being able to display objects or content with sufficient resolution that the objects or content are perceived as being a desired level of satisfaction. For example, a 4K×2K display has sufficient resolution to display four conventional HD quality images on the same screen, such that HD quality or better resolution can still be achieved on a higher resolution display in accordance with various embodiments described herein where original objects or content are modified, reproduced or expanded when being displayed on the rear display 318.

For example, this higher resolution display may allow a single pixel from the display of FIG. 10A to be mapped for display in multiple pixels, as illustrated in FIG. 10B. For example, FIG. 10B has doubled the number of available pixels in both of the vertical and horizontal axes. In the example of FIG. 10B, a first mapped object 818 corresponds to the first object 812 and second mapped object 821 corresponds to the second object 815.

According to various embodiments, a vision corrective display 303 (FIG. 5) may leverage the high resolution properties of a high-resolution display to modify an object for generating a corresponding vision corrected object. As shown in the non-limiting example of FIG. 10B, the pixel of C1 in FIG. 10A is mapped to one or more of the pixels C10, c10, C11, and c11 of FIG. 10B. Each pixel of FIG. 108A corresponds to a set of four sub pixels in the higher resolution display of FIG. 10B. However, only a portion of the sub pixels may be used. After mapping the object to a higher resolution display, the vision corrective display 303 modifies the object reproducing and shifting each reproduced object by an offset amount, where the offset amount may depend on the optical power of the viewer's eye. This is discussed in further detail with respect to at least FIG. 10O.

Referring next to FIG. 10O, shown is a drawing of an example of modifying the mapped objects 818, 821 of FIG. 10B. The mapped objects may be reproduced to generate reproduced objects. As shown in the non-limiting example FIG. 10O, a mapped object is reproduced four times to generate four reproduced objects. Each reproduced object may be shifted by an offset amount that is based on a visual parameter such as, for example, the optical power of the viewer. In the non-limiting example of FIG. 10O, a first reproduced object 825a is shifted horizontally to the right by five pixels, a second reproduced object 825b is shifted vertically down by five pixels, a third reproduced object 825c is shifted horizontally to the right by five pixels and vertically down by five pixels, and a fourth reproduced object 825d is not shifted.

Figure 10C:
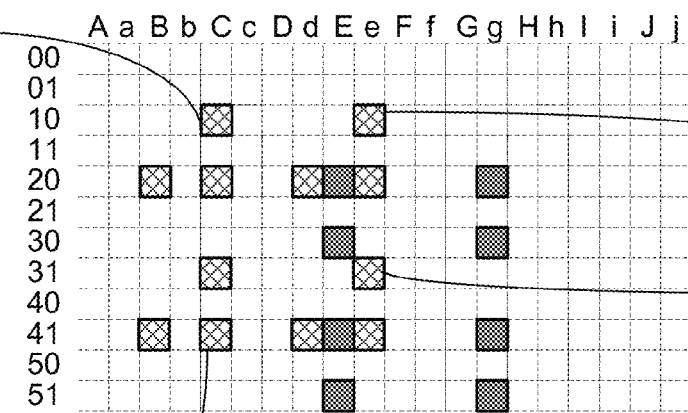
FIG. 10C is a drawing of an example of expanding the object of FIG. 10B, according to various embodiments of the present disclosure.

The non-limiting examples of FIGS. 10B-C provide one among many schemes to expand an object vertically and horizontally. Specifically, FIGS. 10B-C demonstrate a scheme for reproducing particular pixels and shifting the reproduced pixels to achieve an effect of expanding an object in the rear display 318. Other examples of expanding an object to generate a vision corrected object include scaling the object along a vector. In this example, a group of pixels are expanded by a scale factor and extended along a horizontal and/or vertical axis. The scale factor may depend on the visual parameter.

As discussed above, an object 812 (FIG. 10A) may be mapped from a lower resolution display to a higher resolution display to generate a mapped object 818 (FIG. 10B). The mapped object 818 may be modified by being reproduced, shifted, scaled, and/or scattered to generate one or more reproduced objects 825. Through this process of rendering a vision corrected object in a rear display 318, it may be the case that the higher resolution properties of a high resolution display are sacrificed to achieve a rendering of sharper (e.g., more in-focus) objects for a viewer with impaired vision.

Figure 11:
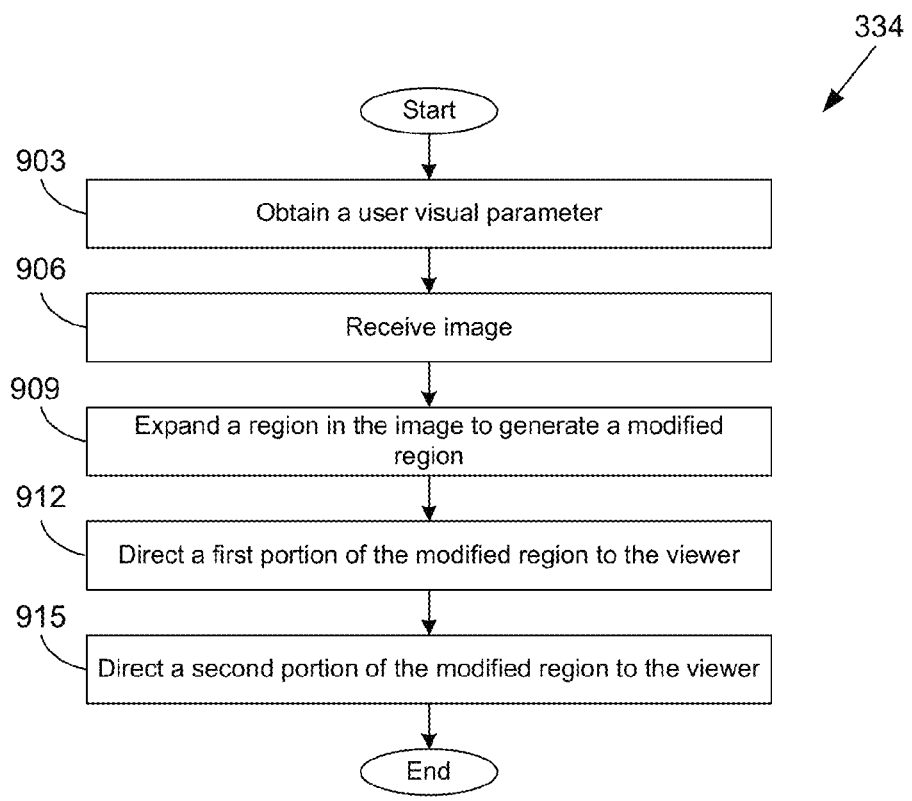
FIG. 11 is a flowchart illustrating one example of functionality implemented as portions of the processing circuitry of FIG. 5, according to various embodiments of the present disclosure.

Referring next to FIG. 11, shown is a flowchart that provides one example of the operation of a portion of the logic executed by the processing circuitry 334, according to various embodiments. It is understood that the flowchart of FIG. 11 provides merely an example of the many different types of functional arrangements that may be employed to implement the operation of the portion of the logic executed by the processing circuitry 334 as described herein. As an alternative, the flowchart of FIG. 11 may be viewed as depicting an example of steps of a method implemented in the processing circuitry 334 according to one or more embodiments.

To begin, the processing circuitry 334 obtains a visual parameter 352 (FIG. 5) (903). The visual parameter 352 may specify a focal length of the eye, an optical power of the eye, a diopter value, an eye prescription value, or any other value indicating the degree of severity of vision impairment of a viewer. According to various embodiments, the visual parameter 352 may include a measure of distance between the viewer and the vision corrective display 303 (FIG. 5). In some embodiments, one or more sensors may be used to sense location, motion and/or the environment of the viewer. In various embodiments, the sensor(s) may be incorporated within the vision corrected display 303 (e.g., image sensors or cameras, acoustic sensors, or other types of environmental sensors). In various embodiments, the sensor(s) may be located externally from the visional corrected display 303 and communicatively coupled to the vision corrected display 303 to provide sensed information to the vision corrected display 303. In various embodiments, the sensor(s) may determine location, motion and/or viewer environment information based on communications be incorporated within the vision corrected display 303 The sensor(s) may be operable to sense angle and/or distance information between the vision corrected display 303 and the viewer(s). The processing circuitry 334 may be operable to obtain the visual parameter 352 based on measurements and/or data collected by the sensor(s). The processing circuitry 334 may comprise data buffers for obtaining and storing the visual parameter 352.

The processing circuitry 334 receives an image (906). The image may be a static picture in a video signal 337 (FIG. 5). Furthermore, the image may be formatted as raw pixel data. The processing circuitry 334 expands a region in the image to generate a modified region (909). An image controller 345 (FIG. 5) of the processing circuitry 334 may modify the image or a portion of the image to cause a rendering of a modified image on a rear display 318 (FIG. 5). The processing circuitry 334 may modify the image such that the image appears to be more in focus for a viewer with impaired vision. Furthermore, the processing circuitry 334 modifies the image according to the visual parameter 352.

In various embodiments of the present disclosure, a viewer selects a portion of the display for identifying a region that is subject to vision correction. The region may be, for example, a lower portion of the display where subtitles are likely to be presented. Alternatively, the processing circuitry 334 may be configured to automatically identify regions for vision correction based on content that is to be displayed in those regions. Alternatively, the processing circuitry 334 may be configured to perform vision correction based the type of content that is to be displayed. For example, the processing circuitry 334 may be configured to identify content or regions of the image that include text, such that vision correction is applied to the textual information (e.g., program guides that are displayed to a viewer, subtitles, or other text to be displayed). In various embodiments, a region of an image for vision correction may comprise a macro block, a sub macro block, a slice, or any other division of a picture to be displayed. For example, a particular object in an image may be modified (e.g., brought into focus) separately or differently than the remaining content in the image so as to highlight or emphasize the particular object, such as for use in advertising or otherwise.

Once the content of an image, object and/or region is determined, the content is modified to generate a modified region. In various embodiments, pixels in the content to be modified are reproduced to generate reproduced pixels and the reproduced pixels are offset from one another to cause an expansion or other modification of the content. The content may also be modified by performing a scaling operation on pixels of the content. The content is expanded or modified to generate a modified region based on the visual parameter 352. The severity of the user's vision impairment may correlate to the degree of modification of the content. The modified content is rendered on the rear display 318.

The processing circuitry 334 directs a first portion of the modified content to the viewer (912). The processing circuitry 334 may direct the first portion of the modified content by masking the modified content using a barrier display 321 (FIG. 5). The processing circuitry 334 may then direct a second portion of the modified content to the viewer (915). A barrier display 321 may adjust its configuration according to a dynamic pattern to cause display of the second portion of the modified content. In this respect, the barrier display 321 may use a dynamically changing mask for selectively directing portions of the modified content at varying points in time. In this respect, the first portion may be directed to the viewer for a first period of time and the second portion may be directed to the viewer for a second period of time. As another example, the first portion may be directed to the viewer's left eye while the second portion is directed to the viewer's right eye. According to various embodiments, the barrier display 321 oscillates between two or more patterns to selectively direct the light emitted from the rear display 318 towards the viewer. The resulting image in the viewer's eye corresponds to focal point that is at or near the retina 111 (FIG. 1) of the viewer. To this end, images rendered by the vision corrective display 303 have increased sharpness and/or reduced blurriness based on the viewer's vision impairment.

A barrier display 321 may be configured to selectively direct the light emitted from the rear display 318 by rendering dynamic patterns that mask portions of the rear display 318. In an alternative embodiment, the pixels of the rear display 318 may include light steering or beam steering functionality to direct the light emitted from the pixels of the rear display 318 in particular directions. In this alternative embodiment, individual pixels that make up modified vision corrected content may be controlled to selectively direct their emitted light toward a viewer using light steering/beam steering functionality in order to control the particular light rays that are received by the viewer's eyes. In such an alternative embodiment, the beam steering pixels of the rear display 318 can be used in place of the barrier display 321 to direct light to viewer.

The flowchart of FIG. 11 show the functionality and operation of an implementation of portions of the processing circuitry 334 implemented in a vision corrective display 303 (FIG. 5). If embodied in software, each reference number, represented as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 11 shows a specific order of execution, it is understood that the order of execution may differ from that which is depicted. For example, the order of execution of two or more blocks may be scrambled relative to the order shown.

Also, two or more blocks shown in succession in FIG. 11 and/or other procedures or flowcharts described herein may be executed concurrently or with partial concurrence. Further, in some embodiments, one or more of the blocks shown in FIG. 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Figure 12A:
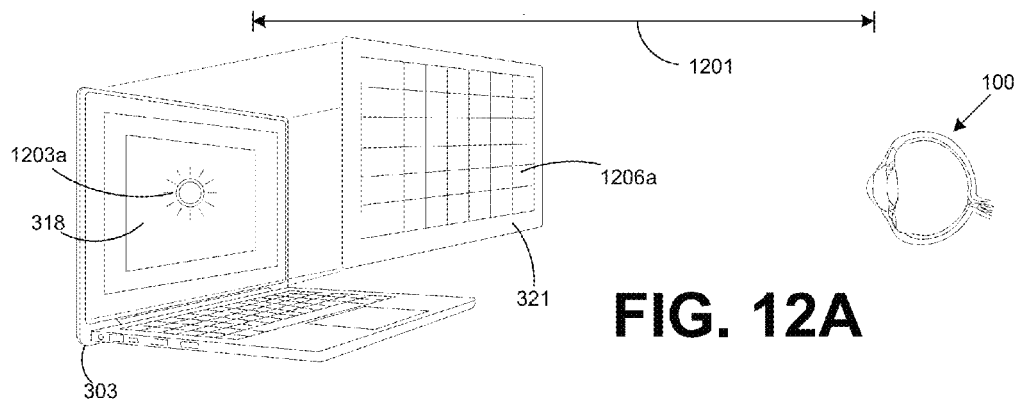
FIGS. 12A-12C are examples of a vision impaired viewer viewing a vision corrective display at varying distances, according to various embodiments of the present disclosure.
Figure 12B:
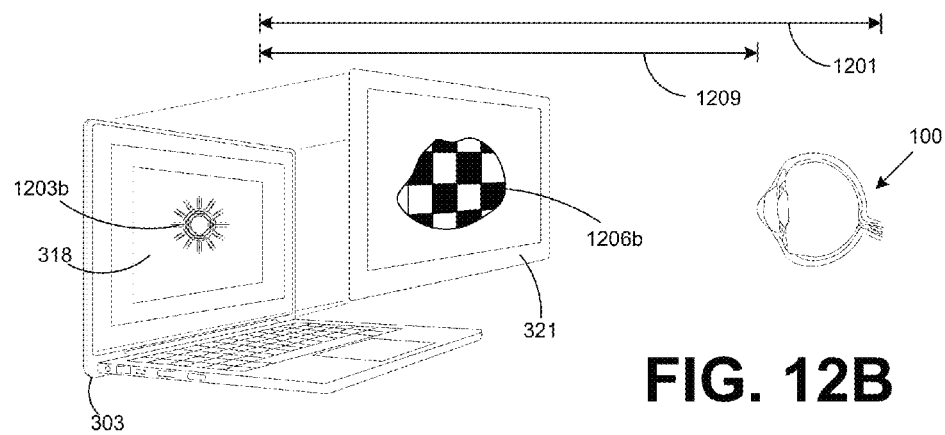
Figure 12C:
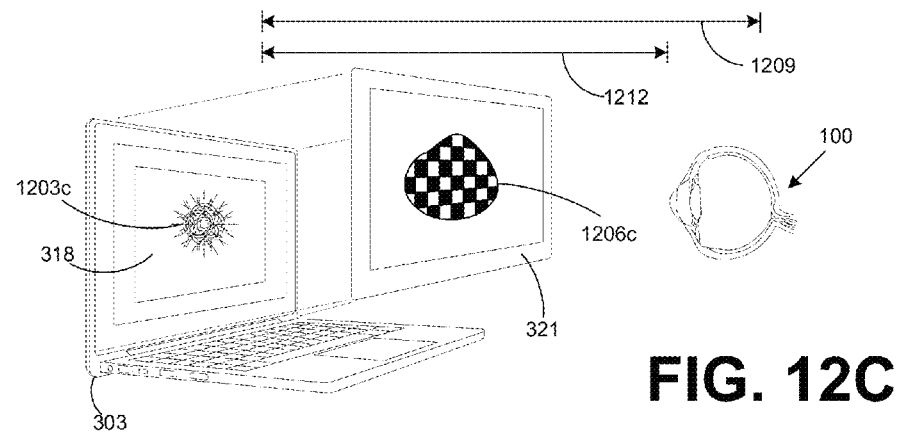

With reference to FIGS. 12A-12C, shown is a non-limiting example of a viewer who configures a vision corrective display 303 to view an object 1203 rendered on the vision corrective display at varying distances. In FIG. 12A, the viewer views an object 1203a rendered on the vision corrective display 303 at a particular distance 1201. At this distance 1201, the viewer's eye 100 is positioned a distance away from the vision corrective display 303 such that the viewer may accurately view content on the vision corrective display 303 without the vision corrective display 303 providing vision correction. In this respect, the object 1203a is rendered on a rear display 318 without modification, such that no compensation for the viewer's vision is required in order for the viewer to view the object 1203a in a desired manner (e.g., viewing the object 1203a in focus). Furthermore, the barrier display 321 may be configured to permit the light radiating from the rear display 318 to pass to the viewer without blocking, filtering, masking or selectively directing the light to the viewer's eye 100. Thus, the barrier display 321 may be operated to be in an effectively transparent state.

If the viewer moves closer to the vision corrective display 303, the object 1203a may become out of focus as a result of the viewer's vision impairment and inability to focus at this closer distance 1209. According to various embodiments, the vision corrective display 303 may be configured to adjust the rendering of the object 1203a to account for the change in distance. As shown in FIG. 12B, the viewer may move closer to the vision corrective display 303 at a distance 1209 that is less than the distance 1201 of FIG. 12A. Without vision correction, the objects may appear out of focus at this distance 1209 of FIG. 12B. By applying vision correction, objects at this distance 1209 are modified to appear in focus to the farsighted viewer.

For example, the rear display 318 may render an object 1203b such that the object 1203b is a modified version of the object 1203a of FIG. 12A. Specifically, the rear display 318 may expand, reproduce, shift, or otherwise modify the object 1203a of FIG. 12A to product the object 1203b of FIG. 12B by accounting for the distance 1209 of the viewer. Thus, the degree of modification is based on the distance 1209 and/or based on any other visual parameter 352, such as the vision prescription of the viewer.

Furthermore, the barrier display 321 may be selectively activated (e.g., to render a pattern 1206b) that causes portions of the rear display 318 to be selectively directed to the eye 100 of the viewer. The pattern 1206b may block portions of light radiating from the rear display 318 to allow the viewer to view the object 1203b in a manner that is relatively in focus or to otherwise contain desired visual characteristics.

With reference to FIG. 12C, the viewer may move even closer to the vision corrective display 303 at a distance 1212 that is shorter than the distance 1209 of FIG. 12B. While some vision correction may be needed for the viewer at a distance 1209 depicted in FIG. 12B, a greater degree of vision correction may be needed at the distance 1212 depicted in FIG. 12C. Thus, the object 1203a of FIG. 12A may be modified by the rear display 318 to a different degree to render the object 1203c of FIG. 12C. To this end, the degree of scaling, expanding, modifying, reproducing, or offsetting of the object 1203c is different in the example of FIG. 12C than in the example FIG. 12B because of the change of distance. Moreover, the pattern 1206c rendered by the barrier display 321 may be different than the pattern 1206b of FIG. 12B. For example, the granularity or rate of change of the pattern 1206c may be adjusted when moving from one distance 1209 to a closer distance 1212.

While the non-limited examples of FIGS. 12A-C are described in connection with a viewer moving closer to a vision corrective display 303, it is understood that operation of the vision corrective display 303 can similarly be adjusted to account for any change in location of a viewer with respect to the vision corrective display 303.

Figure 13:
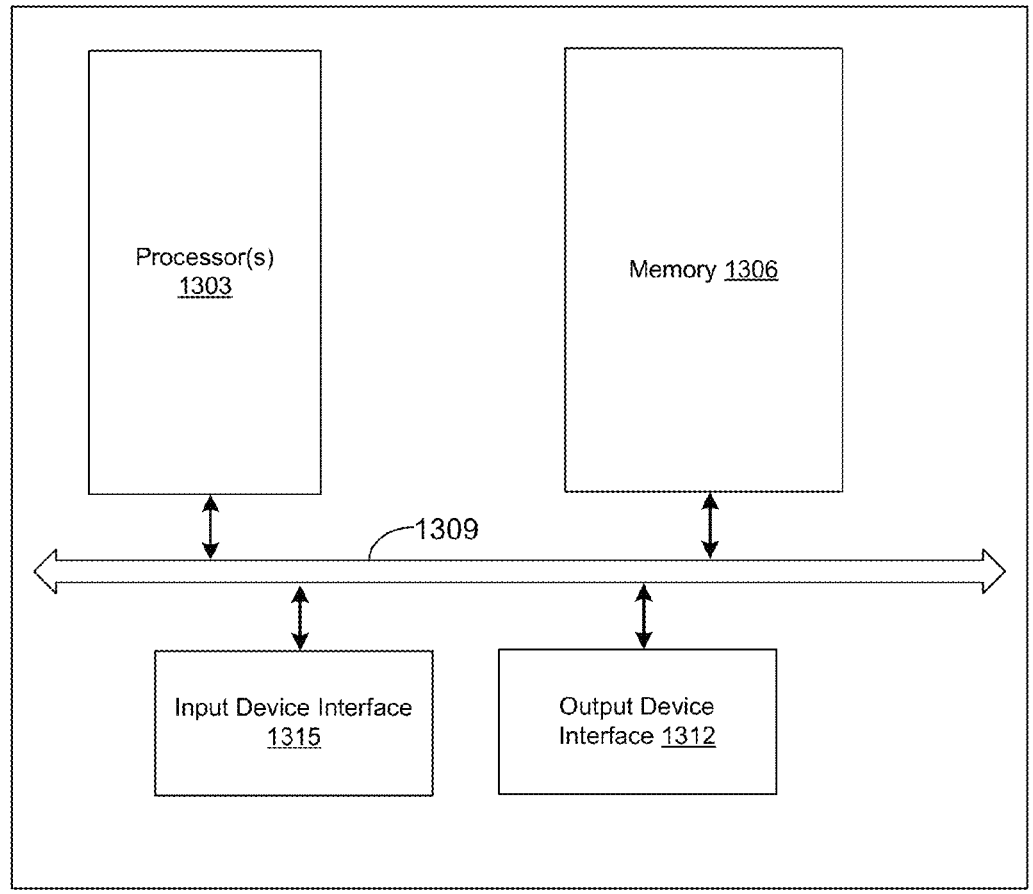
FIG. 13 is a schematic diagram of the processing circuitry of the vision corrective display of FIG. 5, according to various embodiments of the present disclosure.

With reference to FIG. 13, shown is a schematic block diagram of portions of the processing circuitry 334 according to an embodiment of the present disclosure. The processing circuitry 334 includes at least one processor circuit, for example, having a processor 1303 and a memory 1306, both of which are coupled to a local interface 1309. The local interface 1309 may comprise, for example, a data bus with an accompanying address/control bus or other bus structure as can be appreciated.

Stored in the memory 1306 are both data and several components that are executable by the processor 1303. In particular, stored in the memory 1306 and executable by the processor 1303 are the image controller 345, image corrector 348, barrier controller 342, and potentially other applications. In this respect, the memory 1306 may comprise the memory 350 of FIG. 5. In addition, the memory 1306 may comprise storage that stores data or files, system memory that allows for random access of data, and read only memory (ROM).

It is understood that there may be other applications that are stored in the memory 1306 and are executable by the processors 1303 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 1306 and are executable by the processor 1303. In this respect, the term "executable" means a program file that is in a form that can ultimately be run by the processor 1303. Examples of executable programs may be, for example, a compiled program that can be translated into machine code in a format that can be loaded into a random access portion of the memory 1306 and run by the processor 1303, source code that may be expressed in proper format such as object code that is capable of being loaded into a random access portion of the memory 1306 and executed by the processor 1303, or source code that may be interpreted by another executable program to generate instructions in a random access portion of the memory 1306 to be executed by the processor 1303, etc. An executable program may be stored in any portion or component of the memory 1306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1306 is defined herein as including both volatile and nonvolatile memory and data storage components. Volatile components are those that do not retain data values upon loss of power. Nonvolatile components are those that retain data upon a loss of power. Thus, the memory 1306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1303 may represent multiple processors 1303 and the memory 1306 may represent multiple memories 1306 that operate in parallel processing circuits, respectively. In such a case, the local interface 1309 may be an appropriate network that facilitates communication between any two of the multiple processors 1303, between any processor 1303 and any of the memories 1306, or between any two of the memories 1306, etc. The local interface 1309 may comprise additional systems designed to coordinate this communication, including, for example, performing load balancing. The processor 1303 may be of electrical or of some other available construction.

The processing circuitry 334 may further include an output device interface 1312 to communicate with one or more output devices such as, for example, a rear display 318, a barrier display 321, or any other output device. The output device may implement one or more communication protocols to facilitate communication between the various components of the processing circuitry 334 and the various output devices.

The processing circuitry 334 may further include an input device interface 1315 to communicate with one or more input devices 13 such as, for example, one or more motion sensors, user input devices 13, a video signal generator, or any other input device. The user input devices 13 may include a touch screen portion of the vision corrective display 303, a keyboard, a mouse, a remote control, or any other user device that allows a user to make selections via a user interface. The video input generator may be any device that generates a video signal 337 or that provides a video stream. The input device interface may implement one or more communication protocols to facilitate communication between the various components of the processing circuitry 334 and the various input devices 13.

Although the image controller 345, image corrector 348, barrier controller 342 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the image controller 345, image corrector 348, barrier controller 342, that comprises software or code can be embodied in any non-transitory computer-readable medium for use by or in connection with an instruction execution system such as, for example, a processor 1303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:
1. A method comprising:
   obtaining a visual parameter associated with a degree of severity of a vision impairment of a viewer;
   receiving content for display;
   modifying display characteristics of the received content according to the visual parameter to generate modified content, the modified content comprising a plurality of reproduced objects, generating the modified content comprising:
      determining an object within the received content to reproduce, wherein the object comprises a pixel or a group of pixels;
      generating the plurality of reproduced objects based on the object;

determining an offset amount using the visual parameter, the offset amount varying in response to varying severity of the vision impairment of the viewer; and
generating the modified content including the plurality of reproduced objects offset from one another along an axis by the offset amount;
rendering the modified content on a rear display; and
selectively activating a front barrier display to control visibility of the modified content according at least in part to the visual parameter, selectively activating the front barrier display to control the visibility of the modified content comprising:
controlling one or more first areas of the front barrier display to cause a first portion of the modified content rendered on the rear display to be visible to the viewer using the visual parameter; and
controlling one or more second areas of the front barrier display to block a second portion of the modified content rendered on the rear display from visibility by the viewer using the visual parameter.

2. The method of claim 1, wherein obtaining the visual parameter comprises obtaining at least one of a parameter associated with the viewer's eyesight, a focal length value of an eye of the viewer, or a corrective lens prescription of the viewer.

3. The method of claim 1, wherein the front barrier display is detachable with respect on the rear display, the detachable front barrier display communicating with the rear display wirelessly.

4. The method of claim 1, further comprising selectively activating the front barrier display to create a parallax barrier.

5. The method of claim 1, further comprising obtaining the visual parameter by obtaining a measure of distance between the viewer and the rear display.

6. The method of claim 1, further comprising selectively activating the front barrier display to block certain portions of the modified content rendered on the rear display from being seen by the viewer while allowing other portions of the modified content rendered on the rear display to be seen by the viewer.

7. The method of claim 1, further comprising selectively activating the front barrier display to prevent the passage of light emitted from the rear display in the direction of the viewer associated with certain portions of the modified content rendered on the rear display while allowing the passage of light emitted from the rear display in the direction of the viewer associated with other portions of the modified content rendered on the rear display.

8. The method of claim 7, further comprising generating the modified content and selectively activating the front barrier display to control visibility of the modified content so that the modified content appears in focus to the viewer.

9. The method of claim 1, further comprising generating the modified content and selectively activating the front barrier display to control visibility of the modified content to account for visual impairment of the viewer.

10. The method of claim 1, further comprising:
rendering the first portion of the modified content on the rear display at a first point in time; and
rendering a third portion of the modified content on the rear display at a third point in time, where the third portion of the modified content rendered on the rear display is visible to the viewer.

11. The method of claim 1, further comprising:
obtaining a first visual parameter and a second visual parameter associated with the viewer;
modifying display characteristics of the received content according to the first visual parameter to generating a first modified content;
modifying display characteristics of the received content according to the second visual parameter to generating a second modified content;
rendering the first and second modified contents on the rear display;
selectively activating a first portion of the front barrier display in a first configuration to allow the viewer to view the first modified content; and
selectively activating a second portion of the front barrier display in a second configuration to allow the viewer to view the second modified content, wherein the first configuration is associated with the first visual parameter and the second configuration is associated with the second visual parameter.

12. The method of claim 11, wherein the first configuration is associated with a first point in time corresponding to a first clock cycle and the second configuration is associated with a second point in time corresponding to a second clock cycle, the first and second clock cycle associating with one or more clock cycle frequencies, wherein each of the one or more clock cycle frequencies is greater than the fastest frame rate that the viewer can perceive.

13. The method of claim 1, further comprising:
receiving a plurality of contents for display to the viewer;
modifying display characteristics of each of the plurality of contents based at least upon the type of each of the plurality of contents to generate a plurality of modified contents;
rendering the plurality of modified contents on the rear display; and
selectively activating the front barrier display to control a first portion of the plurality of modified contents rendered on the rear display to be visible to the viewer and a second portion of the plurality of modified contents rendered on the rear display to be invisible to the viewer according at least in part to the visual parameter.

14. The method of claim 1, wherein the modifying display characteristics of the received content includes at least one of shifting, expanding and distorting at least a portion of the received content according to the visual parameter.

15. The method of claim 1, further comprising obtaining the visual parameter by obtaining a measure of at least one of a distance, a position and an angle with respect on the rear display.

16. The method of claim 1, further comprising obtaining motion of the viewer and selectively activating the front barrier display to control visibility of the modified content according at least in part to the motion of the viewer.

17. The method of claim 1, further comprising obtaining input from the viewer and selectively activating the front barrier display to control visibility of the modified content according at least in part to the input from the viewer, wherein the input from the viewer comprises one or more vision characteristics of the viewer.

18. The method of claim 1, wherein the object comprises a pixel.

19. The method of claim 1, wherein the object comprises a group of pixels.

20. A system comprising:
processing circuitry configured to:
obtain a visual parameter associated with a degree of severity of a vision impairment of a viewer;
receive content for display to the viewer;

modify display characteristics of at least a portion of the image according to the visual parameter to generate a modified content, the modified content comprising a plurality of reproduced objects, the processing circuitry configured to generate the modified content by:
  determining an object within the received content to reproduce, wherein the object comprises a pixel or a group of pixels;
  generating the plurality of reproduced objects based on the object;
  determining an offset amount using the visual parameter, the offset amount varying in response to varying severity of the vision impairment of the viewer; and
  generating the modified content including the plurality of reproduced objects offset from one another along an axis by the offset amount;
render the modified image on a rear display; and
selectively activate a front barrier display to selectively direct light emitted from the rear display to control visibility of the modified content according at least in part to the visual parameter, selectively activate the front barrier display to selectively direct light emitted from the rear display to control visibility of the modified content comprising:
  controlling one or more first areas of the front barrier display to direct a first portion of the light emitted from the rear display to the viewer using the visual parameter; and
  controlling one or more second areas of the front barrier display to block a second portion of the light emitted from the rear display from visibility by the viewer using the visual parameter.

21. The system of claim 20, wherein the processing circuitry is configured to obtain the visual parameter by obtaining at least one of a parameter associated with the viewer's eyesight, a focal length of an eye of the viewer, or a corrective lens prescription of the viewer.

22. The system of claim 20, wherein the visual parameter is based at least in part on a measure of distance between the viewer and the rear display.

23. The system of claim 20, wherein, the processing circuitry is further configured to selectively activate the front barrier display to prevent the passage of light emitted from the rear display in the direction of the viewer associated with certain portions of the modified content rendered on the rear display while allowing the passage of light emitted from the rear display in the direction of the viewer associated with other portions of the modified content rendered on the rear display according at least in part to the visual parameter.

24. The system of claim 23, wherein the processing circuitry is configured to selectively activate the front barrier display to render a dynamic pattern to mask at least a portion of the light emitted from the rear display.

25. The system of claim 20, wherein the processing circuitry is further configured to generate the modified content and selectively activate the front barrier display to control visibility of the modified content to account for visual impairment of the viewer.

26. The system of claim 20, wherein the processing circuitry is further configured to generate the modified content and selectively activate the front barrier display to control visibility of the modified content so that the modified content appears in focus to the viewer.

27. The system of claim 20, wherein the front barrier display is detachable with respect on the rear display, the detachable front barrier display communicating with the rear display wirelessly.

28. A method comprising:
  obtaining a visual parameter associated with a degree of severity of a vision impairment of a viewer;
  modifying display characteristics of at least of a region of an image according to the visual parameter to generate a modified image, the modified image including at least one image region comprising a plurality of reproduced objects, generating the modified image comprising:
    determining an object within the received content to reproduce, wherein the object comprises a pixel or a group of pixels;
    generating the plurality of reproduced objects based on the object;
    determining an offset amount using the visual parameter, the offset amount varying in response to varying severity of the vision impairment of the viewer; and
    generating the modified content including the plurality of reproduced objects offset from one another along an axis by the offset amount;
  rendering the modified image on a rear display; and
  controlling visibility of the modified image according at least in part to the visual parameter, controlling visibility of the modified image comprising:
    controlling a front barrier display to cause a first set of one or more of the reproduced objects rendered on the rear display to be visible to the viewer using the visual parameter; and
    controlling the front barrier display to block a second set of one or more of the reproduced objects rendered on the rear display from visibility to the viewer using the visual parameter.

29. The method of claim 28, wherein the visual parameter is based at least in part on at least one of a parameter associated with the viewer's eyesight, a focal length value of an eye of the viewer, or a corrective lens prescription of the viewer.

30. The method of claim 28, further comprising receiving information selecting the region of the image to be modified.

31. The method of claim 28, wherein the image is at least a portion of video content.

32. The method of claim 28, wherein the visibility is controlled by selectively activating a barrier display that masks certain portions of light emitted from the rear display according at least in part to the visual parameter.

33. The method of claim 32, further comprising generating the modified image and selectively activating the barrier display to control visibility of the modified image so that the modified content appears in focus to the viewer.

34. The method of claim 32, further comprising operating the barrier display to mask the light emitted from the rear display by rendering a dynamic pattern.

35. The method of claim 34, further comprising operating the barrier display to render a dynamic pattern that oscillates between a first pattern and a second pattern.

36. The method of claim 28, wherein the plurality of reproduced objects comprise a plurality of reproduced pixels.

37. The method of claim 36, controlling visibility of the modified image comprising:
  controlling the front barrier display to cause a first set of one or more of the reproduced pixels to be visible to the viewer, the first set of reproduced pixels having an angle of incidence on an eye of the viewer causing at least a portion of the modified image to appear in focus to the viewer; and controlling the front barrier display to block a second set of one or more of the reproduced pixels from visibility to the viewer, the second set of reproduced pixels having an angle of incidence on the eye of the viewer causing the at least a portion of the modified image to appear out of focus to the viewer.

\* \* \* \* \*